United States Patent [19]

Handelman et al.

[11] Patent Number: 6,057,859
[45] Date of Patent: May 2, 2000

[54] LIMB COORDINATION SYSTEM FOR INTERACTIVE COMPUTER ANIMATION OF ARTICULATED CHARACTERS WITH BLENDED MOTION DATA

[75] Inventors: David A. Handelman; Stephen H Lane, both of Princeton; Vijaykumar Gullapalli, Lawrenceville, all of N.J.

[73] Assignee: Katrix, Inc., Princeton, N.J.

[21] Appl. No.: 08/828,491

[22] Filed: Mar. 31, 1997

[51] Int. Cl.⁷ .................................................. G06T 15/70
[52] U.S. Cl. ......................... 345/474; 345/473; 345/475; 364/578
[58] Field of Search ................................... 345/473, 474, 345/475; 364/578

[56] References Cited

U.S. PATENT DOCUMENTS

| | | | |
|---|---|---|---|
| 4,600,919 | 7/1986 | Stern | 345/473 |
| 5,214,758 | 5/1993 | Ohba et al. | 345/473 |
| 5,623,428 | 4/1997 | Kunii et al. | 345/473 |

OTHER PUBLICATIONS

Gullapalli, et al., "Synergy Based Learning of Hybrid Position/ Force Control for Redundant Manipulators", in Proc. of the 1996 International Conference on Robotics and Automation.

Lane, et al., "Modulation of Robotic Motor Synergies Using Reinforcement Learning Optimization" Neural Networks in Robotics, G.A. Bekey & K.Y. Goldberg, Edt. Kluwer Academic Publishers. Boston MA 1993.

Geoffrey Hinton, "Parallel Computations for Controlling an Arm" Journal of Motor Behavior, 1984, vol. 16, No. 2, 171–194.

Berkinblit, "Model of the Control of the Movements of a Multijoint Limb" Biophysics vol. 31. No. 1 pp. 142–153, 1986, Printed in Poland.

Smith et al., "End Point Position Control Using Biological Concepts" 8th IEEE International Symposium on Intelligent Control, Aug. 25–27, 1993.

(List continued on next page.)

Primary Examiner—Mark R. Powell
Assistant Examiner—Kimbinh Nguyen
Attorney, Agent, or Firm—Allan Jacobson

[57] ABSTRACT

A method and apparatus for interactively controlling and coordinating the limb movements of computer-generated articulated. On-line computational methods are used for animating limb movements of articulated characters by solving associated forward and inverse kinematics problems in real time subject to multiple goals and constraints. The methods fully interactive goal-directed behaviors, such as bipedal walking, through simultaneous satisfaction of position, alignment, posture, balance, obstacle avoidance, and joint limitation constraints. Goal-based motion primitives, called synergies, coordinate sets of joint movements which separately attempt to satisfy each of the above constraints. The present methods adapt character movements on-line to accommodate uneven terrain, body modifications, or changes in the environment by automatically transforming and producing joint rotations relative to the instantaneous point of contact of the body with the world. Recorded motion data is combined with interactive control techniques to manipulate the animation of articulated figures. The methods enable computer animated characters to produce fully interactive goal-directed behaviors, while retaining qualitative characteristics of the original non-interactive motion data. Non-interactive motion capture and keyframe data, representing examples of desired character movements, are accommodated in the present animation system in three ways: 1) direct approach—non-interactive motion data used directly to specify desired body posture synergy goals as a function of time, 2) hybrid approach—non-interactive motion data and program control commands blended to specify elements of desired position, alignment and/or balance synergy goals as a function of time, and 3) template approach—non-interactive motion data used to auto-tune adjustable parameters, enabling program control commands to generate fully interactive movements that qualitatively resemble the non-interactive motion data.

72 Claims, 28 Drawing Sheets

OTHER PUBLICATIONS

Badler, "Dynamic Behavior for Real Time Synthetic Humans" Course 11 Notes 22nd International Conference on Computer Graphics and Interactive Techniques, Aug. 6–11, 1995, Los Angeles, CA.

Hodgins et al., "Control Systems for Dynamically Simulated Humans" ACM Sigraph 1995, Course Notes, Georgia Institute of Technology.

Granieri, "Real Time Implementation Issues for Simulating Humans", Siggraph 1995, Course 11 22nd International Conference on Computer Graphics and Interactive Techniques, Aug. 6–11, 1995, Los Angeles CA.

Hodgins, "Control Systems for Dynamically Simulated Humans"—Course 11 22nd International Conference on Computer Graphics and Interactive Techniques, Aug. 6–11, 1995, Los Angeles, CA.

Metaxas, "Articulated Figure Dynamics, Control and Shape Capture" 22nd International Conference on Computer Graphics and Interactive Techniques, Aug. 6–11, 1995, Los Angeles, CA.

Granieri et al, "Behavioral Control for Real–Time Simulted Human Agents" 1995 Symposium on Interactive 3D Graphics, Monterey, CA.

Cassell et al., Animated Conversation: Rule Based Generation of Facial Expression, Gesture & Spoken Intonation for Multiple Conversational Agents Computer Graphics Proceedings, Annual Conference Series, 1994.

Badler et al., "Posture Interpolation with Collision Avoidance" Proceedings of Computer Animation 94, Geneva, Switzerland, May '94.

Badler, et al., editors, "Making Them Move, Mechanics, Control and Animation of Articulated Figures" Morgan Kaufmann Publishers, Inc., San Mateo, CA. 1991.

Badler, et al., Simulating Humans/Computer Graphics and Control Oxford University Press, New York, 1993.

Jane Wilhelms, "Toward AutomaticMotion Control", IEEE, Apr. 1987, pp. 11–22.

Jane Wilhelms, "Toward Automatic Motion Control", University of California, Santa Cruz, IEEE, Apr. 1987, p. 18.

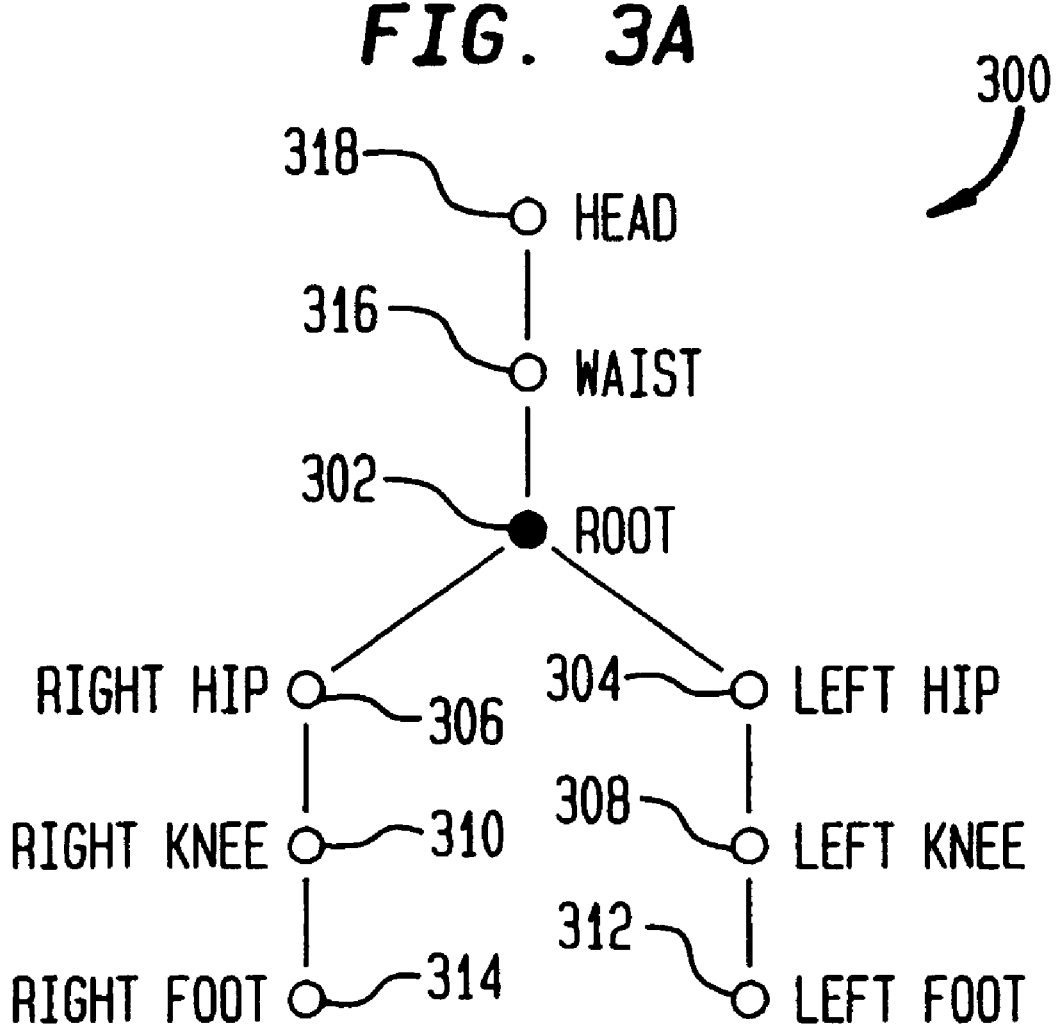

LIMB COORDINATION SYSTEM FOR INTERACTIVE COMPUTER ANIMATION OF ARTICULATED CHARACTERS WITH BLENDED MOTION DATA

FIELD OF THE INVENTION

The present invention relates to the field of computer animation. Additionally, the present invention further relates to the field of computer animation in which motion data is used to animate articulated characters.

BACKGROUND OF THE INVENTION

Computer assisted animation is known. In computer assisted animation, the animator is helped by the computational power of the computer to render sequences of images which, when played back frame by frame, creates the desired animation. Creating interactive sequences of animation to replicate natural human or animal-like motion is of particular interest to the animator, and is particularly difficult to create.

Key Framing

Computer animators have traditionally used forward kinematic approaches based upon "key framing" to produce animation. Keyframing involves specifying the positions of the joints at specific instants in time during the desired motion (the key frames), then interpolating between the positions of the joints in successive key frames to generate the intermediate positions of the joints over the time interval of the desired animation. As a result, key framing builds motion sequences frame by frame. The keyframing approach to character animation is very tedious and time consuming, often requiring several work-days of effort to produce a few seconds of animation. Keyframing also relies heavily on the artistic abilities of the animator in order to produce realistic motions that appear smooth and natural.

Motion Capture

An alternative animation method to keyframing is known as "motion capture". In this approach, sensors attached to a human actor or a mechanical device are used to record (i.e., capture) data representing the positions of the joints of a person or animal over time during the performance of a desired motion. The result is a predetermined (i.e. "canned") motion script. This "canned" motion script is then used to drive a forward kinematic model of the character in order to produce the desired animation. Although motion capture is a powerful method for reproducing complex natural human or animal-like motion, its main drawbacks are 1) the character's body configuration is restricted to be similar to that of the performer generating the motion-capture data, 2) the resulting animations are stereotypical and limited to the set of movement data collected during the motion capture session, and 3) the range of possible movements is restricted to the movements a real person or animal is capable of performing.

Inverse Kinematics

It also is known to use inverse kinematics for computer animation. In inverse kinematics (IK), a desired position and/or orientation in three-dimensional space is specified for a particular part of an articulated character's body. Inverse kinematic methods are then used to calculate body joint angles such that the particular part can be moved to the desired position and/or orientation. Inverse kinematics often is used with keyframing approaches to assist the animator in manipulating the character's body into the desired postures for the key frames, thereby allowing animated character movements to be produced with less design effort.

Traditional IK methods are based on matrix manipulations that require significant amounts of on-line computation to determine the set of joint angles that enable, for example, a character's head, hands and feet to be simultaneously placed in desired locations. When matrix inverses are used, this computational requirement grows approximately as a cubic of the number of joints in the character. For example, if a traditional IK method takes 1 millisecond of computation time for a character with 1 joint, it could take approximately 1000 milliseconds for a character with 10 joints. If the character had 100 joints, it could take approximately 1000 seconds (more than 16 minutes) to perform the same computational task. Moreover, in certain joint configurations known as singular configurations, matrix-based inverse kinematic methods can completely fail to produce a solution. And finally, traditional IK does not guarantee that the collective limb and joint movements resulting from the computed joint angle motion will be natural and life-like. This is especially true when the character has redundant joints, that is, when there are more joints than the minimum needed to perform the specified motion. Since all animals have multiply redundant joints, traditional inverse kinematics approaches have serious shortcomings when applied to the animation of human or animal-like body configurations.

Interactive Animation

In keyframing and motion capture-based approaches to animation, the resulting character animations produced are scripted and non-interactive. Consequently, for interactive applications, such as video games and virtual reality simulators, keyframing and motion capture techniques are often unsatisfactory. In an interactive video game environment, a user has total freedom to choose where to go in a three dimensional (3D) world. However, the details of how the character representing the user moves and interacts with the environment are usually determined in advance by an animator. As a result, articulated characters such as human and animal-like figures found in today's games and network applications are not fully interactive. That is, the characters have a limited set of movements, and always act and react in a stereotypical manner.

In a typical animated baseball game, for example, the batter can only swing high or low; there is no in-between. In a fighting game, the losing opponent goes down the same way; first time, every time. In addition to generating movements that are scripted, and hence predictable, current methods of producing interactive character animation are also tedious and time consuming to carry out, even for the most basic of human movements. The animator must create not only the primary movements of a character (e.g. kick, punch, block, etc.), but also all the transition motions that enable the character to arbitrarily sequence from one primary movement to another without any noticeable jumps, jerks or unnatural motions. Since the total number of these transitions can become incredibly large, even for a character with a small number of primary movements, the motions of most interactive characters today are restricted to movements between a few fixed body postures.

Behavioral Animation

A more attractive alternative to animating interactive characters with "canned" motion scripts, as in keyframing and motion capture approaches, is to use behaviors instead. Behaviors are defined as self-initiated movements generated in response to goal-based commands and interactions with the environment. Examples of behaviors are movements that enable a character to automatically "walk forward", "sit", "stand", "jump" and the like. High-level goal-based behaviors can be achieved using an integrated combination of both forward kinematics and inverse kinematics. The main advantage of animating characters using behaviors is that a potentially infinite variety of resulting movements can be created on-line, and modified in real-time. As a result, the characters produced by behavioral animation are both responsive to the user and interactive with their environment.

Behavioral animation is described in textbooks such as "Simulating Humans" by Badler, N. I., Phillips, C. B. and Webber, B. L., Oxford University Press, 1993, and "Making them Move" by Badler, N. I., Barsky, B. A. and Zeltzer, D., Morgan Kaufman Publishers, 1991. However, while a behavioral animation system in which a character is animated in response to a high-level command is simple and intuitive to describe, actual systems and software which achieve behavioral animation remain an elusive goal. The present invention achieves realistic real-time behavioral animation in interactive applications such as video games, virtual reality training simulators, world wide web browsers, and for generating computer-animated film and television productions.

SUMMARY OF THE INVENTION

The present invention is embodied in a Limb Coordination System involving on-line computational methods for coordinating limb movements of articulated characters by solving associated forward and inverse kinematics problems in real time subject to multiple goals and constraints. The Limb Coordination System of the present invention determines how the joints of an interactive character should rotate as a function of time to produce goal-directed limb movements that appear natural and realistic to the viewer. The present invention is embodied in a method and apparatus for interactively controlling and coordinating the limb movements of computer-generated articulated characters with an arbitrary number of joints.

A novel on-line successive approximation method is used for solving inverse and forward kinematics problems concurrently, taking into account multiple goals and constraints. As a result, the present method is capable of producing fully interactive goal-directed behaviors in real-time for three-dimensional articulated characters with multiple limbs through the simultaneous satisfaction of position, alignment, posture, balance, obstacle avoidance, and joint limitation constraints.

In addition, when a specified part of the body is designated as a contact point by the Limb Coordination System, the character's joint movements are automatically transformed such that all its body motion is produced relative to the contact point. The ability to define and redefine the contact point enables a character's movements to adapt in an on-line manner to accommodate uneven terrain, modifications to its body, or changes in the environment.

Synergies

To animate the movements of a character's body, the Limb Coordination System performs separate calculations at each joint using goal-based motion primitives called synergies. A synergy is defined herein as a process which produces a set of joint angle movements that attempt to satisfy a higher-level goal, such as a positioning, alignment, posture, balance, obstacle avoidance, or joint limitation constraint. Five primary synergies are disclosed in the present invention: Position, Alignment, Avoidance, Balance and Posture. A primary synergy's name corresponds to the constraint it attempts to satisfy, with the exception that joint limitation constraints are enforced by a Synergy Coordination process discussed hereinafter. In addition, two types of synergy components: Tangential and Radial, are also disclosed. These synergy components are used to provide the Position, Alignment, Avoidance and Balance synergies with movement components in both tangential and radial directions.

The synergies disclosed in the present invention use a novel geometric successive approximation process which greatly simplifies the problem of limb coordination. During each step of the successive approximation process, a first body joint is moved independently, while the movements of the other joints are temporarily frozen, and the error (e.g. position error, balance error etc., depending on the synergy) is minimized to a new error. Then a second body joint is moved independently, while freezing the movements of a new set of other joints, and the new error is minimized. This procedure continues until all the joints have been moved independently to minimize the error. The synergy output at the end of each approximation step is a set of suggested joint angle movements for the joint under consideration. In addition to the above, during each approximation step another process called Joint Coordination is used to combine suggested joint rotations computed by a synergy to improve computational efficiency and produce natural-looking limb and body movements.

At the end of each pass of the successive approximation process, each synergy produces a different set of suggested joint angle movements. A Synergy Coordination process is used at this stage, to achieve high-level objectives (such as walking) that require the simultaneous satisfaction of multiple goals and constraints. The Synergy Coordination process determines the relative contribution of each synergy to the overall movement based upon weighting factors that adjust the strengths (or gains) of the synergies. For example, if a character is about to fall down, the joint angle movements suggested by the balance synergy might be given more weight (i.e. strength) than those suggested by the posture synergy.

During each pass of the successive approximation process defined above, the joints are moved on a trial basis only (i.e., a phantom movement) and the movements are not actually used in the rendering of the image. Joint Coordination is used to determine the order in which synergy computations are applied to a set of joints. It is only at the end of the successive approximation process that the final set of weighted joint angle rotations are applied to the character and used in the rendering of the image that produces the desired animated movements.

Behaviors

A behavior is a higher-level function, often constructed using the laws of physics and other logic, that supplies synergies with goals such as the positions of the hands, head, feet and center-of-gravity as a function of time and also sets the relative strengths of the synergies. For example, a jumping behavior can be created by giving a character's body mass, attaching springs to its legs, then pulling the body down and releasing it. Jumping motions are produced by simulating the dynamics of the mass-spring system on-line in real time. Consequently, in such a behavior the more the legs are compressed prior to takeoff, the higher the character jumps. In addition, when the feet hit the ground during landing, the legs automatically flex at the knees to the extent necessary to absorb the force of the impact; the higher the original jump, the more the knees automatically flex.

Higher-Level Motor Tasks

More complex motion sequences can be created using behaviors as building blocks. For example, a higher-level task such as walking over uneven terrain while avoiding obstacles can be performed by jointly activating a walk behavior for generating forward motion, a dynamic balance behavior for automatically repositioning the character's center-of-mass and feet as a function of the surface contour, and an obstacle avoidance behavior for stepping/jumping over or going around obstacles. By embedding additional physics into these behaviors, the character can be made to naturally trip, slip, and stumble in response to rocks, banana peels and other impediments the user might happen to interactively place in its way.

Traditional inverse kinematics methods typically require the use of computationally intensive matrix inverse calculations. The power of the present invention is apparent when one considers that a human being has more than 200 degrees-of-freedom, as do most animals, which makes it practically impossible to use matrix-based inverse kinematic methods to interactively animate any realistic human or animal-like character in real time. Computational requirements of matrix methods scale approximately as a cube of the number of joints. In contrast, the present invention does not use matrix inverse calculations and has computational requirements that scale linearly with the number of joints. In other words, if 1 joint requires 1 millisecond of computation time, then with the present invention, 100 joints will only require on the order of 100 milliseconds (0.1 seconds) of computation time, whereas the matrix method of the prior art would require 1,000,000 milliseconds (more than 16 minutes). Scaling linearly with the number of joints enables the present invention to interactively animate moderately complex articulated characters in real time using commonly available personal computers.

Furthermore, traditional inverse kinematic methods have to converge to a solution (usually defined as a minimum error condition) before the results of the computation can be used to animate the character. Using partially computed results of matrix inverse calculations, if they can be used at all, typically causes unstable, oscillatory motion of the limbs and large positioning errors.

In contrast, the present invention is an iterative computational procedure that always produces meaningful joint motion (with no singularity conditions) after each iteration of the computation. It is not necessary to wait for the present process to converge to a minimum error condition. The results of the calculation can be used "anytime", i.e., within the constraints of a real time animation system. The present methods tolerate more tracking error, i.e., greater position, velocity or acceleration error, than matrix inverse methods, but in return provide more natural motion, and faster calculations.

Thus the present invention can handle body configurations in which matrix methods fail. In addition, a single iteration involves very little computation in the present method, and any additional iterations serve to rapidly increase the accuracy of the results, with most cases requiring less than 4 iterations to converge. This results in fast, accurate animation that appears natural and realistic. The "anytime" nature of the present method also means that non-converged intermediate computational results can be used without destabilizing future computations. Intermediate results also can be used as the starting point for the next computation iteration, making the present invention ideal for animating articulated characters in interactive applications.

The present invention uses a computational method that is based on geometry rather than error gradients. In addition, the present invention incorporates a computational method for coordinating joints based on the body configuration that prevents unstable, oscillatory motion from taking place. The latter stabilizing method is not only useful with the present invention, but also can be used with other prior art incremental inverse kinematic approaches, including those based upon error gradients.

And finally, as indicated above, the present invention enables a character's joint hierarchy (skeleton), represented as a collection of kinematic chains, to be anchored in the world at arbitrary points of contact. The variable contact point feature allows characters to produce fully-interactive, non-scripted goal-directed movements that are capable of accommodating environmental variability.

Blending Synergies with Motion Data

Some of the above animation techniques are interactive and others are not. The techniques of keyframing and motion capture produce fixed, i.e., scripted and non-interactive motion data Interactive techniques, such as behavioral animation, and others, are desirable because of their ability to provide computer generated animation in an interactive environment.

Production of interactive character animation utilizing large collected libraries of motion data (generated using both motion capture and keyframing techniques) would be highly desirable. For example, fixed film libraries contain motion data of Fred Astaire dancing. It would be desirable to use such non-interactive motion data to create interactive animated characters who dance like Fred Astaire. In a similar manner, an interactive animated character can obtain a characteristic walk (like Groucho Marx), and an interactive animated ball player can obtain the motion characteristic of a favorite athlete, e.g., running or jumping in a recognizable manner (like Michael Jordan). The present invention is directed towards combining non-interactive motion data with interactive control to achieve animation with the characteristics of both the recorded motion data and the interactive control.

In particular, the present invention is embodied in on-line computational methods for significantly enhancing playback of canned motion sequences by making the playback interactive in real time. In addition to playing back non-interactive motion data (joint angle time histories) in its original form, the data can be interactively modified to alter the motion of all or a subset of the body's joints in a goal-directed fashion, while retaining the qualitative characteristics of the original motion data. Thus, for example, if non-interactive motion data of a baseball swing is available, not only can the swing be played back as it was originally recorded, but similar swings also can be generated in which the bat trajectory is modified to swing high or low depending on the pitch.

In order to add interactive control to the playback of non-interactive motion data, a common signal interface between the two must be established. That is, both the motion data and the interactive control must be expressed in a form in which the two can be added together to animate the articulated character. In the preferred embodiment of the present invention, motion is represented as a set of joint angle commands, a contact point and a contact chain. The joint angle commands represent the angles by which each joint is to be rotated, the contact point in world coordinates is the part of the body in contact with the larger environment, and the contact chain represents the order of transform processing consistent with and derived from the stored representation of the body.

To animate the movements of a character's body, a limb coordination system is used that performs separate calculations at each joint using goal-based motion primitives called synergies. A synergy is a process which produces a set of joint angle movements that attempt to satisfy a higher-level goal, such as a position, alignment, posture, balance, obstacle avoidance, or joint limitation constraint. Five primary synergies are preferred in the present limb coordination technology: Position, Alignment, Avoidance, Balance and Posture. Together, these synergies provide a comprehensive ability to interactively control the motion of the character's body. Each of the synergies produces a set of joint angle movements that attempt to satisfy one constraint. When the synergies are combined with different weights, the resulting motion is a blend of the motion due to each constraint. Motion is effected by giving more weight to one synergy. For example, for a fighting character, more weight might be given to balance rather than posture, so the character is less likely to fall down. For a dancer, motions might look more fluid if additional weight were given to movements centered around particular body postures.

In the present invention, motion data is translated to be expressed in the same form as motion commands derived from synergies. Then, the motion data can be compared or combined with the synergy outputs to produce motions having the characteristics of both. The amount of influence of the motion data therefore depends, like any other synergy, on the weight given to it.

In the present invention, non-interactive motion data is combined with the interactive limb coordination in three ways.

Direct Combination

In the present invention, interactive motion data animation technology is used to control the motion of a subset of the free joints during the course of playback. For example, if non-interactive motion data for a walking gait only specified how the legs and hips move during the walk, the motion data is used to direct leg and hip movement, while synergy-based control is used to drive the motion of the arms, either to swing realistically to match the gait, or to perform any task required such as pointing, waving, or gesturing in an interactive and realistic fashion. In addition, when non-interactive motion data is directly used, the interactive motion data animation technology of the present invention enables smooth transitions to be generated from one motion sequence to the next in a sequence automatically, such as transitions from purely synergy-based control to non-interactive motion data playback and back again to purely synergy-based control.

Hybrid Combination

In the hybrid approach, both non-interactive motion data and interactive animation program control commands are blended to specify elements of desired position, alignment, avoidance, posture, balance and/or joint limitation synergy goals as a function of time. The non-interactive motion data provides one set of joint angle commands as a function of time. The synergy-based limb coordination provides another set of joint angle commands as a function of time. Since the joint angle commands from both motion capture data and interactive based synergies are combined, the resulting motion is both interactive, and bears a resemblance to the original non-interactive motion data.

Templates Creation

In the template approach, non-interactive motion data is used to create a template for interactive synergy based control, enabling purely synergy-based animation control to interactively produce motions characteristic of the original motion data movement sequences. Samples of motion data are compared to movement data from synergy-based interactive control, for similar tasks or behaviors. The error between the non-interactive motion data and the synergy-based data is quantified using a suitable error function. The parameters of the synergy-based control, such as synergy strengths and gains, are then modified, and the process is repeated, so as to minimize the error. Any one of a number of well known error minimization techniques, such as least squares minimization, may be used in the process. Creating a template from non-interactive motion data "tunes" the adjustable synergy parameters, enabling subsequent program control to generate fully interactive movements that qualitatively resemble the original motion data.

The present methods integrate non-interactive motion data with interactive control, taking into account multiple motion sequences with arbitrary transitions between sequences, and multiple interactively specified goals and constraints. As a result, the present methods are capable of producing seamless playback of non-interactive motion data sequences with additional fully interactive goal-directed behaviors in real-time through simultaneous satisfaction of position, alignment, posture, balance, obstacle avoidance, and joint limitation constraints.

BRIEF DESCRIPTION OF THE DRAWINGS

FIG. 3A is an example of a joint hierarchy for an armless biped character,

FIG. 11 is a stick figure illustration of proximal-to-distal Joint Coordination using the Tangential Synergy component of the Balance Synergy in accordance with the present invention.

DETAILED DESCRIPTION

Figure 1:
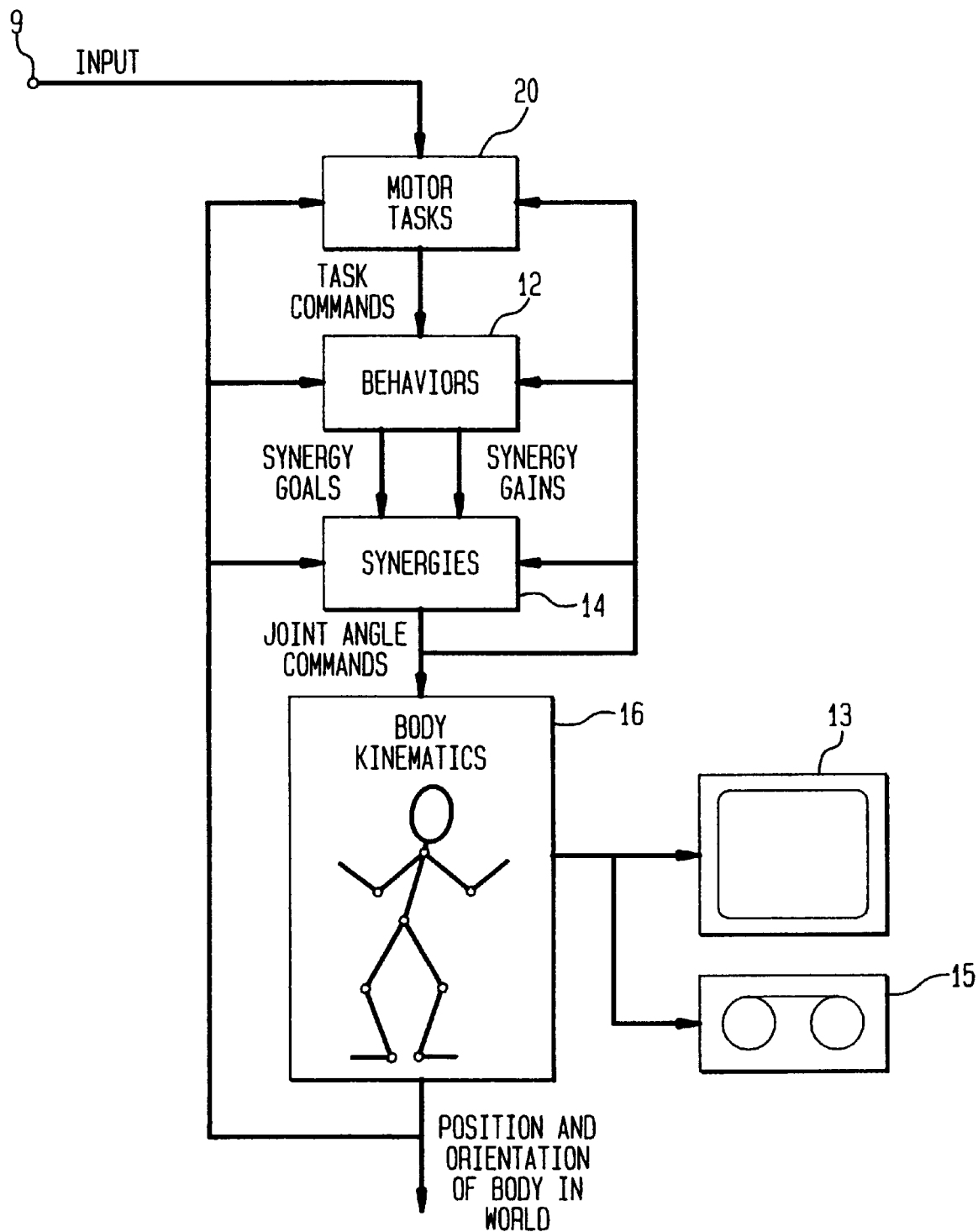
FIG. 1 is block diagram of the overall system of behavioral animation embodying the present invention.

An overview of a behavioral animation system is shown in FIG. 1. High-level motor tasks 10 which are generated in response to user input commands 9, are decomposed into lower-level task commands that activate and coordinate behaviors 12. Behaviors 12 set goals for the next lower level, synergies 14, which in turn provide joint angle commands for the body kinematics and image subsystem 16 to graphically render the joint angle commands on the video image as motion.

To realize the high-level motor tasks 10, groups of behaviors 12 are organized to form the desired motor tasks 10 and are coordinated to realize a fully functional animated character that can interact and move in its environment and respond to user commands 9 in real-time. For example, the high level motor task "go open the door" may be a sequence of behaviors such as "walk", "reach", "grab" and finally, "pull".

Behaviors endow the animated character with task specific capabilities such as walk, run, jump, pull, dodge, etc., and simplify the animator's job considerably. Behaviors also permit general interactions between the animated character, its environment, and the user without the need for pre-programming the kinds of interactions permitted or pre-specifying the nature of the environment.

At the next lower level, behaviors activate groups of synergies (synergy goals, and synergy gains), which are implemented by the synergy subsystem 14. Behaviors generate the goal values for the lower level synergies. Synergies are often collected into groups which are associated with behaviors for convenience. The outputs of the synergy subsystem 14 are commands to the body kinematics function 16, which, in cooperation with the image storage, rendering and display functions 16 actually animate the character by generating video for display 13 or storage 15, which may be a magnetic tape or form of disk storage media, or any computer memory.

Below the synergy 14 level, animation is driven by joint angle commands. Animation is created when the character's position is updated in memory (by changing joint rotations, and/or body part positions and orientations), and the rendering subsystem creates a frame of video with the character in the new computed body pose and location.

A basic concept herein is that of a "synergy". A synergy couples the motion of a subset of a character's joints for the purpose of satisfying a specific goal as specified by behavior 12 and task 10 commands. More particularly, a synergy couples the motion of a subset of a character's joints responsive to a specific goal or constraint. For example, a simple goal is to move a hand from point A to point B. In so moving the hand from the initial position to the final position, movement of several of the body's limbs are affected. In the present invention, movement from an initial point to a final point is realized by plural synergies, each of which coordinate some or all of the body limbs in making the desired movement. Each of the plural synergies takes into account at least one constraint (e.g. balance, posture, etc.). Generating hand movement based on a balance constraint produces different limb movements than generating hand movement based on a posture constraint. In the present invention, the plural synergies are coordinated by combining the joint angle commands from the different synergies, to provide limb movement which takes into account such different, plural synergies. By coordinating synergies, a more natural limb motion is achieved.

The speed and quality of the Limb Coordination System is dependent on how the synergies are implemented. In the present invention, successive approximation is used to solve forward and inverse kinematics problems in real time to coordinate the limbs of human and animal-like articulated characters. Characters are animated while simultaneously attempting to satisfy the constraints of position, alignment, posture, balance, obstacle avoidance, and joint limitation. The simultaneous satisfaction of multiple constraints enables the creation of fully interactive goal-directed behaviors that produce life-like limb coordination and body movements. Although the present method is implemented to run on-line and in real-time (as in a video game), the present method also may be used to generate video on a non-real time basis, as may be useful in traditional animation (film, television, cartoons etc.).

Character Representation

The physical structure of a character is referred to as a "body". A body is a skeleton comprised of "links" connected together by "joints" in a hierarchical tree-like structure. Joints are body joints such as wrists and elbows, while links are body parts between joints, such as forearms, lower leg, foot, etc. Each link has various attributes associated with it, the most important of which are its mass and physical dimensions. The dimensions are usually fixed, but they can be variable if the link can, for example, elongate or shrink in size. Joints join two links together in a way that allows them to rotate in relation to each other about the joint's axes of rotation. The preferred embodiment uses Euler angles to represent the orientation of a joint relative to its parent. Any order of rotation about three orthogonal coordinate axes in a frame of reference may be used. An alternative embodiment can be formulated based upon use of quaternions to represent the orientation of a joint relative to its parent.

The entire body is "anchored" at a point in its 3D environment to a point of the body called the "contact point" or "anchor point". As used herein, when relative position reference is made with respect to a plurality of joints, those joints closer to the contact point in the joint hierarchy (in terms of the number of links between them and the contact point) will be referred to as relatively "proximal" joints, while those joints further away from the contact point in the joint hierarchy will be referred to as relatively "distal" joints. In such manner, the terms proximal and distal are relative terms describing a given joint relative to the contact joint. Joints may thus be ordered in terms of their distance in the joint hierarchy from the contact point, proximal-to-distal, or distal-to-proximal.

In a preferred embodiment of the invention, the Limb Coordination System consists of the following components:

BODY: a tree-like data structure used to represent the hierarchical relationship and physical properties of the joints and links in an articulated figure's body. A limb coordinated body can have any joint serve as the origin (i.e. contact point) for the body's forward kinematic chain computations, SYNERGIES: Low-level goal-based motion primitives producing joint movement commands that attempt to satisfy position, alignment, balance, posture, avoidance or joint limitation constraints, SYNGROUPS: Groups of synergies that, when activated by a behavior, produce goal-directed actions that attempt to satisfy multiple constraints.

BEHAVIORS: Mid-level command generators, functions and conditional logic that activate SynGroups and provide the associated synergies with desired goals, gains and relative strengths as a function of the task at hand so that the articulated character performs a specified high-level action such as getting up from a chair or opening a door.

MOTOR TASKS: High-level command generators, functions and conditional logic that activates specific behaviors in conjunction and in sequence to perform specified tasks.

Figure 2:
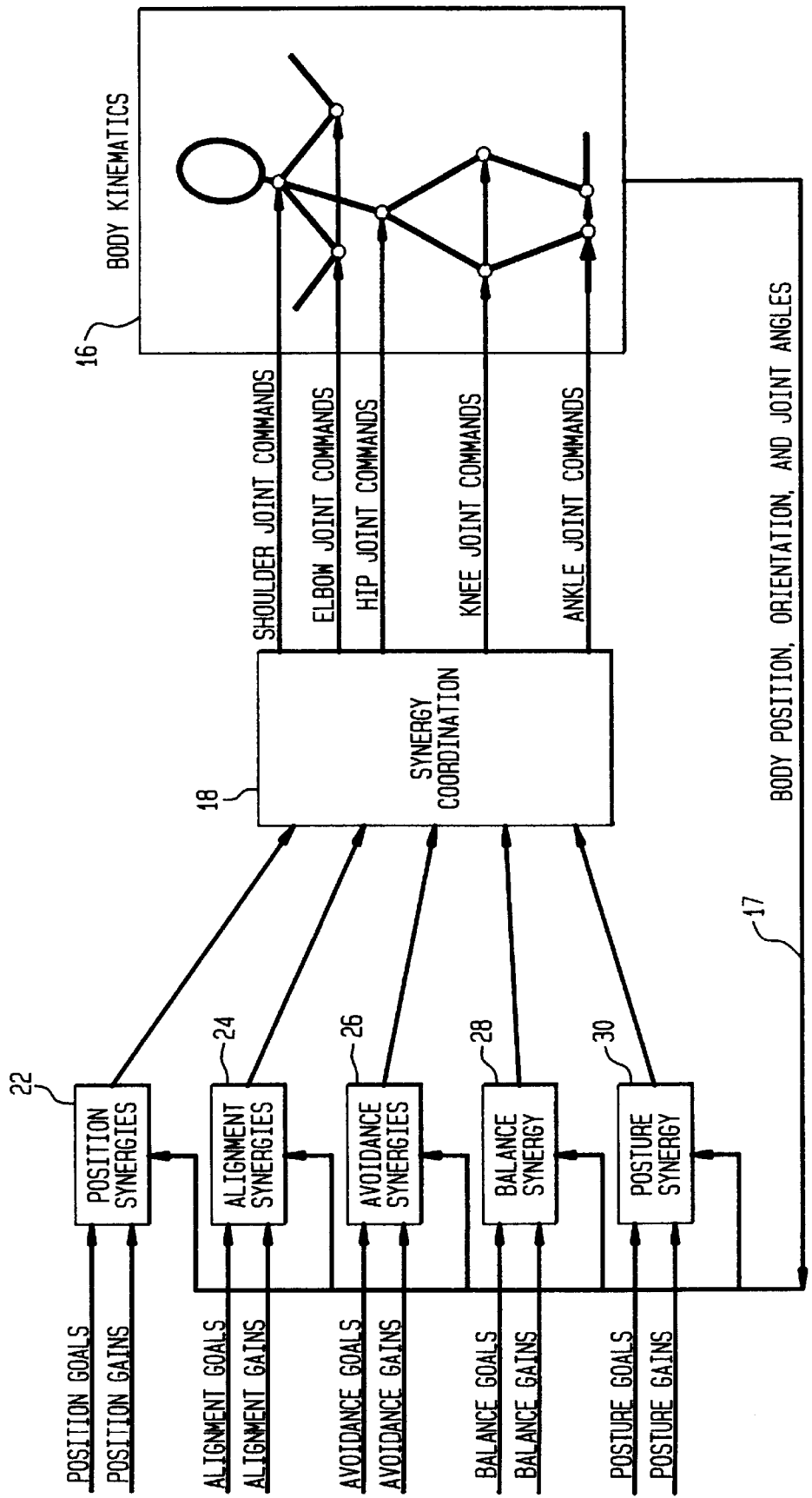
FIG. 2 is a block diagram illustrating the coordination of synergies to produce body mechanics in accordance with the present invention.

A layered approach is used to control the animation of a body as illustrated in FIG. 1. At the lowest level 14, one or more synergies are used to coordinate the motion of subsets of the body's joints. The body position is updated using forward kinematics based upon the active contact point. When more than one synergy is actively controlling a joint, a synergy coordination mechanism is used to arbitrate between the synergies. Synergy coordination is illustrated in FIG. 2 by example. The body kinematics 16 is responsive to right and left shoulder, elbow, hip, knee and ankle joint commands from the synergy coordination function 18. Synergy coordination 18 is a process for coordinating the outputs of position synergies 22, alignment synergies 24, avoidance synergies 26, balance synergy 28 and posture synergy 30 using weighted sum. prioritization and winner-take-all combination schemes. The output of each synergy 22–30 is a set of angles through which each joint is to be rotated. The contribution of each synergy to the final resulting movement is not necessarily equal. The resulting movement provides new position, orientation and joint angles for the body kinematics 16, which are used in a feedback arrangement 17, as the new body position reference from which to compute the next set of synergy outputs.

Representation of a Body

In the present Limb Coordination System, a body skeleton composed of joints is maintained for each articulated character. The parenting relationship of one joint to another defines the body topology, which can be represented by a tree structure 300. An example of joint parenting, for an armless bipedal character, commonly referred to as a "biped", is illustrated by the topology in FIG. 3A. The joints are root 302, left hip 304, right hip 306, left knee 308, right knee 310, left foot 312, right foot 314, waist 316 and head 318.

The root joint specifies the origin of the joint tree, and therefore has no parent. On the left side of the body, the left hip is parented to the root, the left knee is parented to the left hip, and the left foot is parented to the left knee. On the right side of the body, the right hip is parented to the root, the right knee to the right hip, and the right foot to the right knee. Finally, the waist is parented to the root, and the head is parented to the waist.

Each joint has additional properties associated with it, including a mass, a preset position and orientation relative to its parent, the joint's position and orientation relative to its preset position and orientation, relative position and orientation limits, a reference to a graphical object representing an associated body part, and dimensions of a bounding box (length, width, and height) to be used in collision detection computations.

A joint also has a type: regular joint or ball joint. The orientation of a regular joint is referenced to (is relative to) its parent, whereas the orientation of a ball joint is referenced to some other coordinate system, usually the world coordinate system. The world coordinate system is the coordinate system of the environment containing the articulated character. Ball joints function as convenient "inertial" platforms that goals can be specified with respect to. For example, a ball joint located at the waist of a biped that moves with the waist, but always remains level, is a convenient frame of reference for specifying the coordinates of positioning and alignment hand and head goals.

During limb coordination, the character body is assumed to have a "contact point" that specifies the point on the skeleton that is anchored in the world. It is the starting point for computing the forward kinematics of the body. The anchor point or contact point for a character is often specified in world coordinates. For example, the contact point for a biped standing on its left foot is its left foot joint. In conventional systems, the "root" of the body remains the contact point when computing the forward kinematics of a character. However, in the present Limb Coordination System, any point (or joint) of a body can be used as a contact point.

Figure 3B:
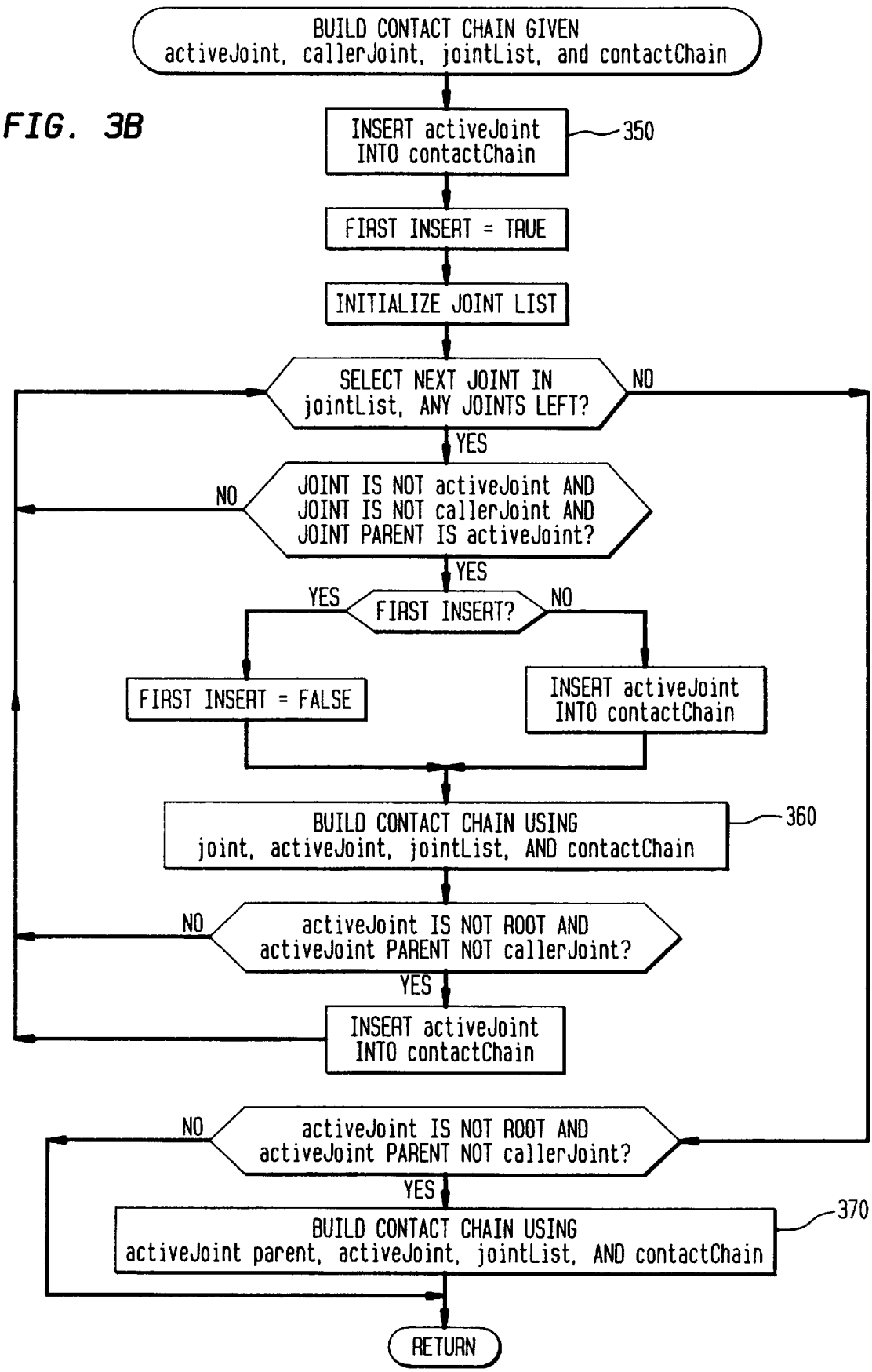
FIG. 3B is a flowchart for creating a contact chain given a hierarchical skeleton composed of parented joints.

To accommodate variable contact points, the Limb Coordination System uses a logical re-parenting of the body skeleton to compute the forward kinematics. The present Limb Coordination System maintains a list of joints for each possible contact point that specifies the order of computation required for the forward kinematics from that contact point. This list can be either computed in advance or generated "on the fly", i.e., in real-time as the system operates. These ordered joint lists are called "contact chains". FIG. 3B illustrates one way to generate contact chains automatically for the sample biped above.

Processing of joints during the forward kinematics computation proceeds from proximal-to-distal joints. The contact point is the most proximal joint, whereas the remaining hand, feet, and head joints, are the most distal joints. FIG. 3B depicts a recursive algorithm that generates a contact chain given an initial joint specified as the contact point (the "contact joint"). As a recursive algorithm, each joint passed as the activeJoint parameter to the algorithm not only adds itself to the contact chain, but also has the option of recursively calling the algorithm with its next distal or proximal joint as the activejoint. In this case the joint calling the algorithm becomes the callerJoint.

The contact chain indicates the order in which relative transformation matrices should be multiplied in order to determine each joint's absolute (world-to-body) transformation matrix. The algorithm first inserts the activejoint into the chain 350, beginning with the contact joint. Then it recursively calls the algorithm for joints which are direct children of the activeJoint in the joint definition hierarchy 360. Finally, it recursively calls the algorithm for the parent of the activejoint 370. As a sample result, the following contact chains show the order of computation (multiplication of transformation matrices) for the sample biped described above and in FIG. 3A.

Left_foot contact chain (left_foot is the contact point): left_foot,left_knee,left_hip,root,waist,head,root, right_hip,right_knee,right_foot right_foot contact chain (right_foot is the contact point): right_foot,right_knee,right_hip,root,waist,head,root, left_hip,left_knee,left_foot head contact chain (head is the contact point): head,waist, root,right_hip,right_knee,right_foot,root,left_hip, left_knee,left_foot The contact chain is generated by starting from the joint designated as the contact point and selecting and adding successive joints back to a branch point such as the root. Continuing from the root (or other branch point), successive joints are selected until an extremity (leave joint in the joint hierarchy tree) is encountered, which can be any remaining extremity not already included in the contact chain. From each extremity, the contact chain is continued by adding the root (or other branch point), then selecting and adding successive joints to the chain until another extremity is reached. The process is continued until all the joints are accounted for in the generated contact chain.

If desired, any point on the skeleton (not just the joints) can be made a contact point by adding a "phantom" joint to the skeleton hierarchy at that location. For example, if a contact point is needed on the lower left thigh between the left hip and left knee, a "phantom joint" can be attached to the thigh link and located as needed, and the previous algorithm can be called to create a contact chain for this new joint. A center-of-gravity (CG) chain, described below, can be created as well. Consequently, the present method for skeleton representation is general in its ability to represent skeleton anchor points.

The Limb Coordination System also uses a similar type of list of joints to compute the center-of-gravity (CG) distal to each joint given the active contact point. The distal CG of a joint is defined as the location of the cumulative mass of all joints distal to the given joint. A "CG chain" is the ordered list of joints that indicates the order in which joints should be considered during the computation of distal CGs.

The CG chain is generated somewhat differently from the contact chain. The CG chain begins by selection of the contact point and is continued by selecting successive joints back to the root (or another branch point). From the root (or branch point), the CG chain continues from an extremity, which can be any remaining extremity not already included in the CG chain. From the selected extremity, the CG chain is continued by selecting successive joints back to the root (or branch point). The process continues until all joints are accounted for in the CG chain.

Figure 4:
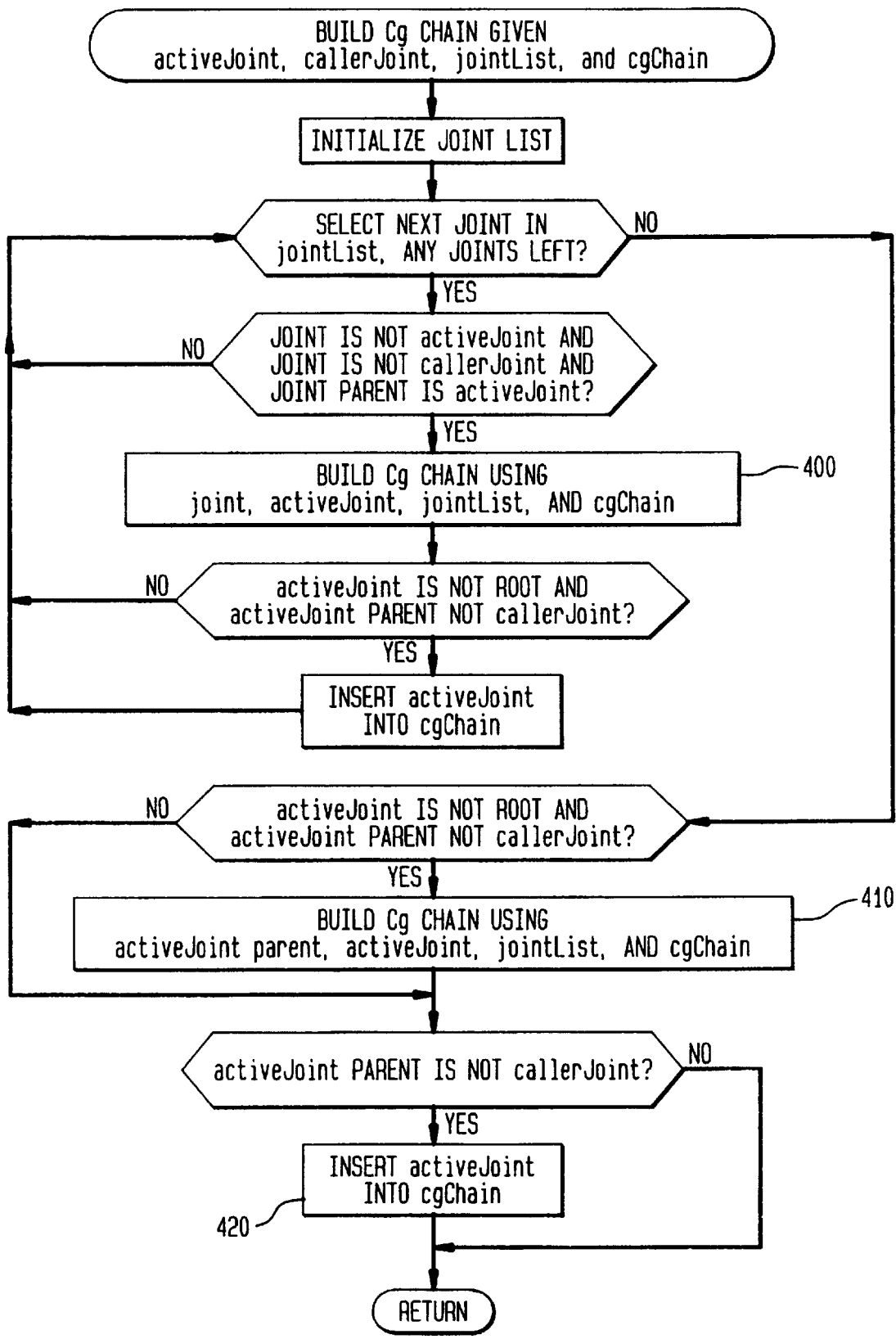
FIG. 4 is a flowchart for creating a center-of-gravity chain given a hierarchical skeleton comprised of parented joints.

CG chain computation proceeds from the distal joints to the contact point. These CG lists can be generated in advance or automatically generated on-the-fly as the system operates. One approach is shown in FIG. 4. The CG chain indicates the order in which distal centers-of-gravity should be computed, from the most distal centers-of-gravity of the joint hierarchy to the proximal contact point. The algorithm first recursively calls the algorithm for joints which are direct children of the activeJoint in the joint definition hierarchy 400. Then it recursively calls the algorithm for the parent of the activejoint 410. Finally, it inserts the active-Joint into the CG chain 420.

The CG chains for the sample body discussed shown in FIG. 3A are as follows:

left_foot CG chain (left_foot is the contact point): right_foot,right_knee,right_hip,head,waist,root,left_ hip,left_knee,left_foot right_foot CG chain (right_foot is the contact point): left_foot,left_knee,left_hip,head,waist,root,right_ hip,right_knee,right_foot head CG chain (head is the contact point): left_foot,left_ knee,left_hip,right_foot,right_knee,right_hip,root, waist,head Synergies A synergy is a computational mechanism for coordinating the motion of a subset of body joints in order to satisfy a specific goal-based constraint. Each synergy has a contact point, a list of joints, a goal, and a set of gains associated with it. Individual joints may be associated with any number of synergies. Given a value for a synergy goal and the current state of the body, each synergy computes how the set of joints it coordinates should move in order to achieve its goal. Relative gains are specified for each of the joints in a synergy, allowing some joints to contribute more towards meeting the synergy's goal than others. Synergy gains can range from 0.0, implying no contribution to the motion of a joint, to 1.0 implying that the joint is moved to the full extent of its computed motion. In addition, each synergy has a strength assigned to it. The synergy strength determines the contribution of that synergy to the total amount of movement computed for the joints. Synergy strengths also range between 0.0 and 1.0. A Synergy Coordination mechanism determines how individual synergy joint movements are combined with the joint movements suggested by other synergies.

The object of a synergy is to position and/or orient a specific control point to satisfy a goal-based constraint. The control point can be any point, joint or vector associated with the body. The specification of the goal for a synergy has three elements: the control point to be positioned, the goal point (the desired location and/or orientation of the control point), and the coordinate frame in which the goal point location is specified. The specification of such a coordinate frame allows the desired goal point location to be specified relative to an any arbitrary coordinate system in 3D space, including that of any other joint. Thus, for example, one can specify where the left hand should be relative to the right hand and the synergy will try to maintain that relative position even as the right hand moves through space.

Five primary synergies are disclosed in the present invention: Position, Balance, Posture, Alignment and Avoidance as well as two types of synergy components (Tangential and Radial). The Tangential and Radial synergy components will be described first, then each primary synergy type in its turn. The Tangential and Radial synergy components are generic. That is, they can be used in Position, Balance, Alignment and Avoidance synergy computations by appropriately defining the respective synergy error vectors.

Tangential Synergy Component

Figure 5A:
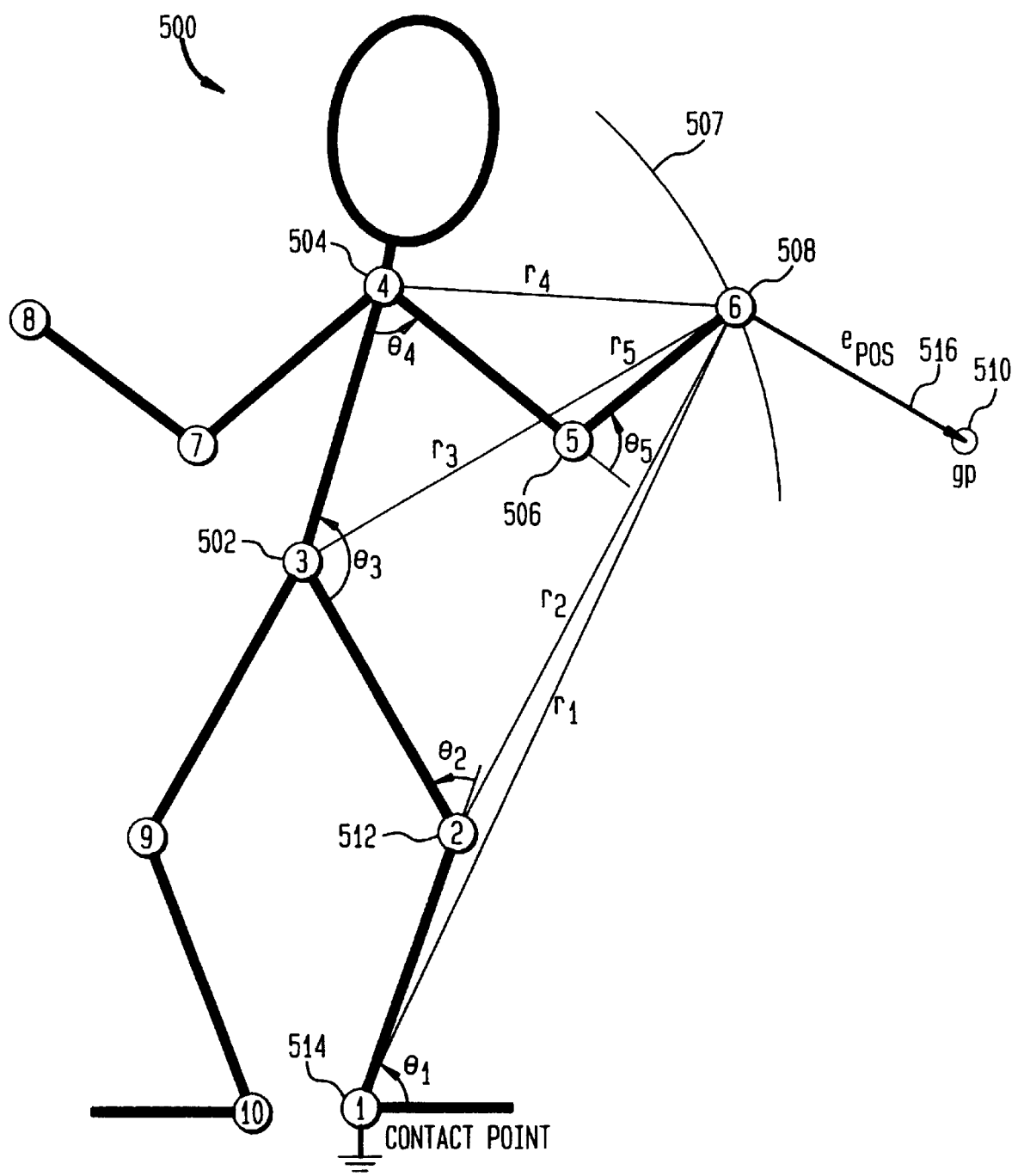
FIG. 5A is a stick figure illustration of the Tangential Synergy component in accordance with the present invention.
Figure 5B:
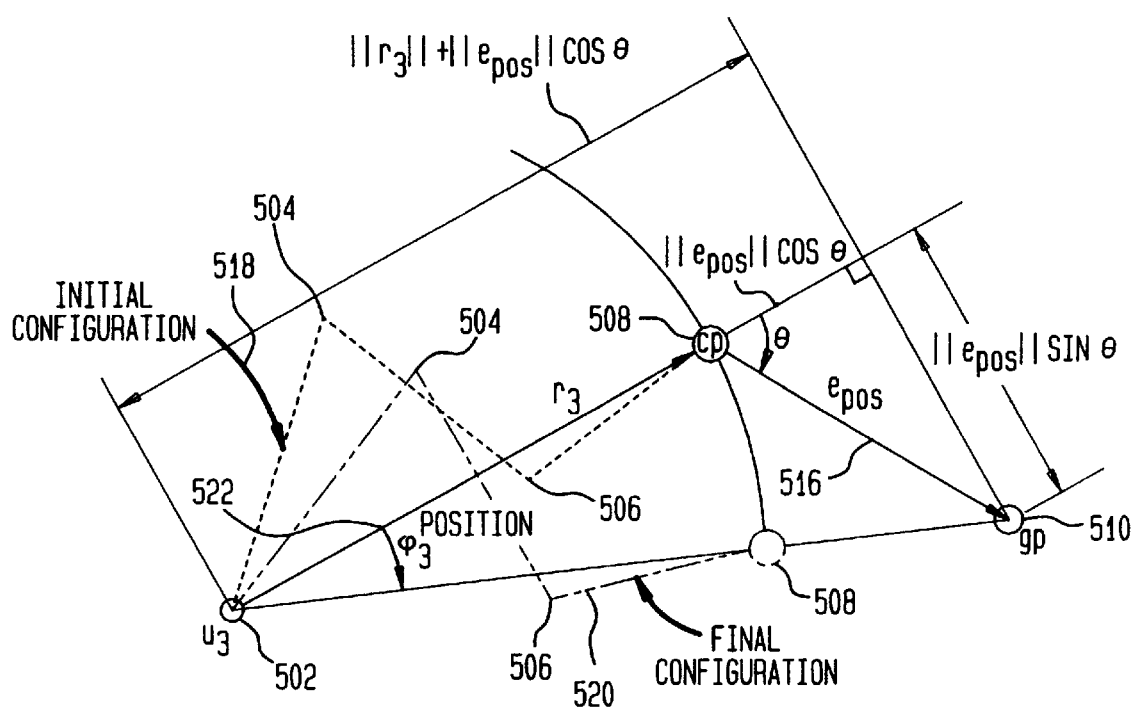
FIG. 5B is a detail diagram of the rotation of joint 3 of FIG. 5A in accordance with the present invention.

FIGS. 5A and 5B illustrate the computation performed by the tangential synergy component. At each joint i, the tangential synergy computes the three-dimensional rotation of such joint that minimizes the error between the goal point (gp) location and the control point (cp) location, assuming that all the other joints are held motionless. The rationale for the tangential synergy component is the following. Because all other joints are held motionless during each synergy computation step, the only possible movements of the control point are rotations about joint i. Moreover, by rotating joint i, the control point only can be located at some point on a sphere centered at joint i. The point on this sphere closest to the desired goal point location lies on the line joining joint i and the desired location. Therefore, as illustrated in the example in FIG. 5B, the synergy computes the joint rotation that moves the control point to lie on this line. The term tangential is descriptive of the motion of the control point tangentially along the arc of a circle.

In particular, in FIG. 5A an articulated character 500 is shown having 10 joints, a head and II body links. The location of the control point and the desired location of the goal point are provided to the tangential synergy component by higher-level behaviors and tasks. In this example, the synergy goal is to move joint 508 (the control point) to the goal point location 51 0. The problem to be solved is to compute the joint angle rotation commands for each joint which minimizes the length of the error vector 516.

Tangential Synergy Computation

As control point 508 is moved towards goal point 510, the movement of the affected limbs will be coordinated by computing joint angle rotation commands at one or more joints using a successive approximation process. For example, arc 507 is the circular trajectory of control point 508 at a radius $r_3$ from joint 502 (hip), as joint 502 is rotated (assuming all other joints are held stationary, i.e., joints 504 and 506 are held frozen or motionless) so as to minimize goal error vector 516. Similar circular trajectories at radii $r_1$, $r_2$, $r_4$ and $r_5$ from joints 514, 512, 504 and 506 (ankle, knee, shoulder and elbow) respectively are scribed for each of the other joints to individually minimize the error vector 516. Each such rotation of the joints, independent of the other joints, is a trial motion forming a successive approximation to the final motion to be used in rendering the video image.

A detail of two successive configurations used in the tangential synergy of FIG. 5A, is shown in FIG. 5B. In particular, FIG. 5B depicts a portion of the articulated character 500 consisting of joints 502, 504, 506 and 508 (from FIG. 5A). The angle of rotation which will rotate joint 502 such that control point 508 is nearest goal point 510 to minimize error vector 516 is computed. The initial configuration 518 of the limbs is shown in dashed lines. The desired final position 520 is showed in alternating dots and dashes. The final configuration minimizes the error vector by bringing control point 508 as close as possible to goal point 510 by rotating joint 502 while holding joints 504 and 506 (and all others) motionless. The final position of joint 508 lies on a line between joint 502 and goal point 510.

Although the position 508 of the control point is referred to above as the "final" position, it is only "final" (assuming the synergy strength is 1.0) with respect to one step of the successive approximation process, i.e. the rotation of the hip joint 502. In the successive approximation process, position 508 is only an intermediate trial position, used for computing the proposed rotation of hip joint 502. In addition to the present tangential synergy, other proposed joint angle rotations for hip joint 502 will be computed from other synergies. The final joint angle rotation commands for hip joint 502 will be the result of the Synergy Coordination 18 shown in FIG. 2.

As illustrated in FIG. 5B, two vectors are used to compute the tangential synergy joint rotation, radius vector, $r_3$ (522), from the joint to be rotated (502) to the control point, and an error vector, $e_{pos}$ (516), from the current control point position to the desired goal point location. These vectors are used to compute a three-dimensional rotation axis and an angle of rotation. The rotation axis for each joint is orthogonal to the associated radius vector (e.g. 522) and the error vector 516. The angle of rotation for each joint is computed using geometry and trigonometry. The tangent of the desired joint angle rotation is proportional to the magnitude of the vector product of the associated radius vector and the error vector, and inversely proportional to the sum of the square of the radius vector and the dot product of the radius vector with the error vector. If the desired goal point location is outside the reach of the character, the tangential synergy will cause the control point to be moved as close to the desired goal point as physically possible.

Tangential Synergy Joint Coordination

Figure 6:
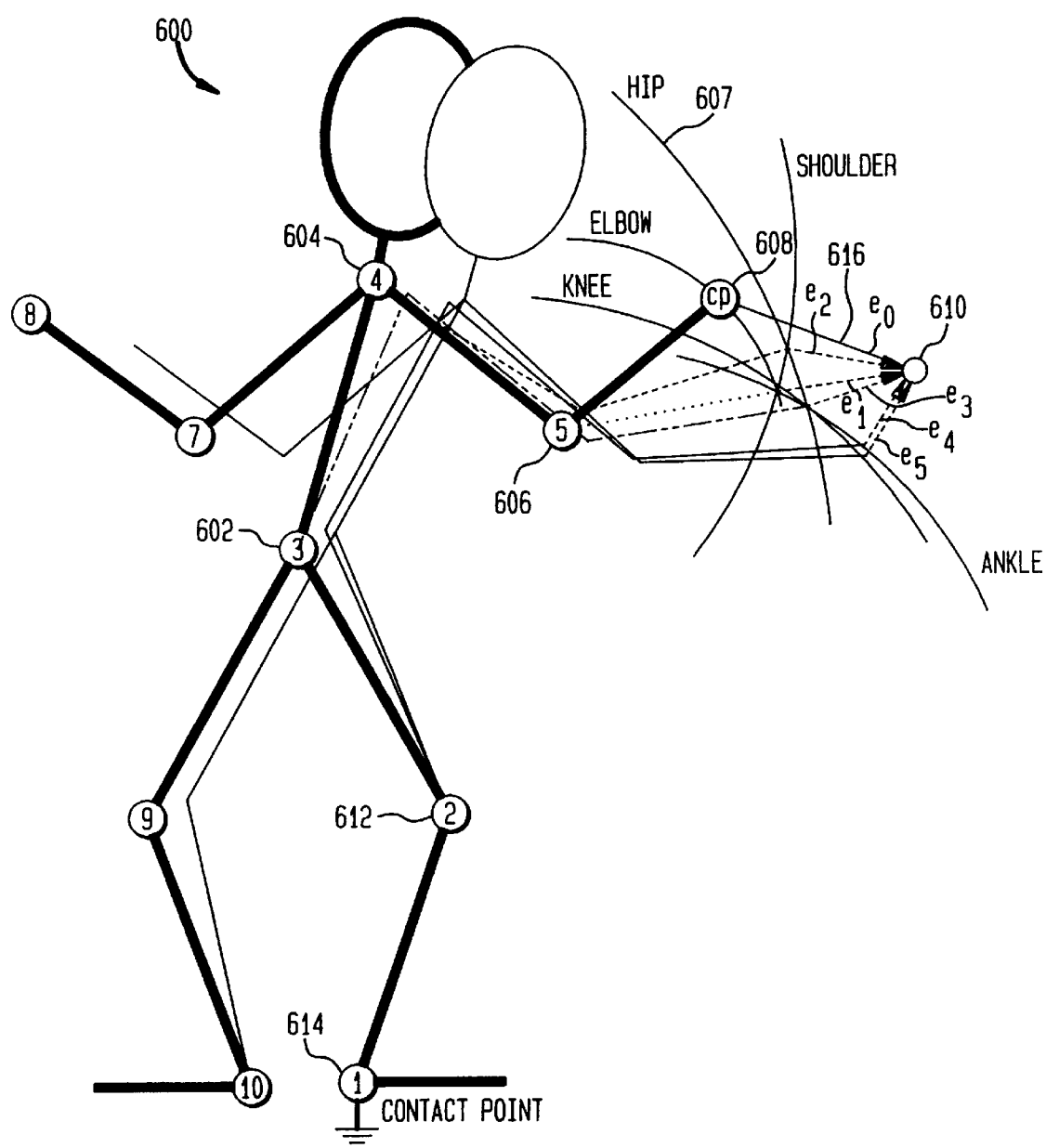
FIG. 6 is a stick figure illustration of distal-to-proximal Joint Coordination using the Tangential Synergy component in accordance with the present invention.

One method of Joint Coordination that is especially useful for coordinating the rotations of the tangential synergy's joints is a distal-to-proximal rule. Joints are arranged in an ordered list, called the SynJoint list, starting with the joint closest to the control point and proceeding towards the contact point. FIG. 6 illustrates the distal-to-proximal rule for computing consecutive reductions in error using the present successive approximation process Joint Coordination method. Joint 608 is the control point and ankle joint 614 is the contact joint.

Rotations are computed for each joint on the SynJoint list, one joint at a time based on the order of appearance of a joint in the SynJoint list. At each step of the successive approximation process, an intermediate position of the control point is computed using standard geometry and trigonometry calculations to rotate the vector r, which extends from the joint under consideration to the control point, to be collinear with the line segment between the joint location and the desired goal point location. The new trial location of the control point is then used to update the error vector e used in the tangential synergy computation at the next proximal joint. The sequence of operation is illustrated in FIG. 6.

Figure 6A:
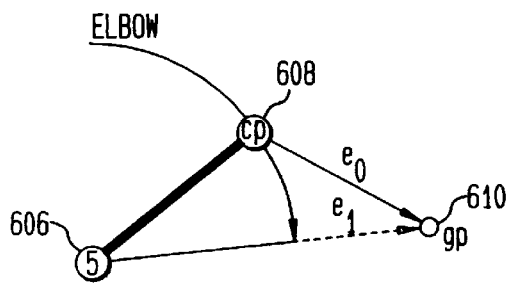
FIG. 6A is a detail of elbow rotation in accordance with the present invention.

In particular, FIG. 6 depicts an articulated character 600 consisting of joints 602, 604, 606, 608, 612 and 614. The distal-to-proximal order of joints is elbow 606, shoulder 604, hip 602, knee 612 and ankle 614. As a first approximation, the rotation of elbow 606 that will move the control point 608 nearest goal point 610 to minimize error vector $e_0$ 616 is computed. A detail drawing of the trial motion of the elbow joint is shown in FIG. 6A.

Figure 6B:
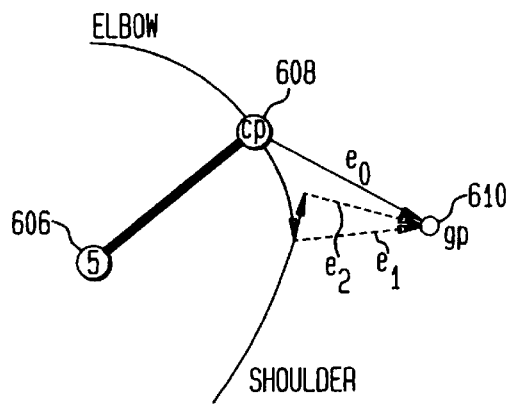
FIG. 6B is a detail of shoulder rotation in accordance with the present invention.

As a next approximation, the rotation of shoulder 604 that will move the control point 608 nearest goal point 610 to minimize the new residual error vector $e_1$ is computed. A detail of the trial motion of the shoulder joint is shown in FIG. 6B.

Figure 6C:
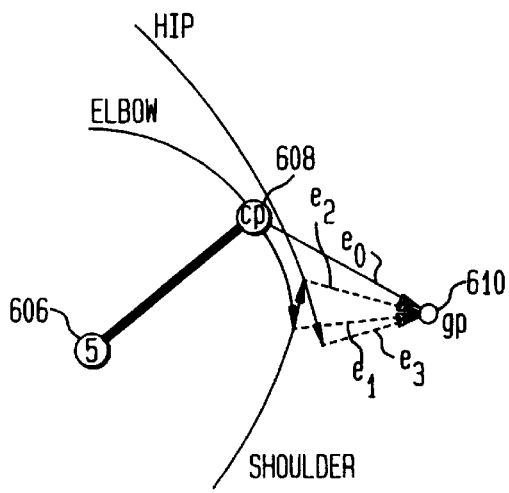
FIG. 6C is a detail of hip rotation in accordance with the present invention.

As a next approximation, the rotation of hip 602 that will move the control point 608 nearest goal point 610 to minimize the new residual error vector $e_2$ is computed. A detail of the trial motion is shown in FIG. 6C.

Figure 6D:
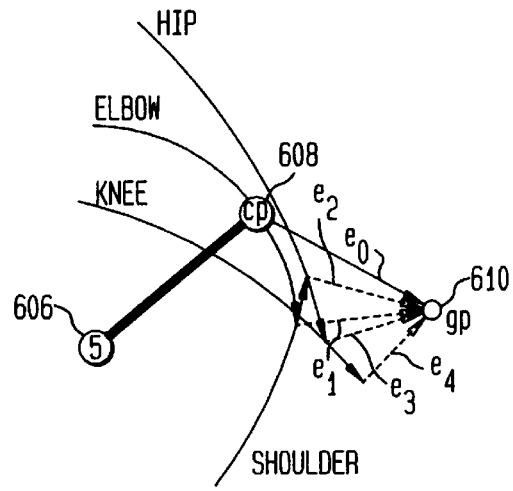
FIG. 6D is a detail of knee rotation in accordance with the present invention.

As a next approximation, the rotation of knee 612 that will move the control point 608 nearest goal point 610 to minimize the new residual error vector $e_3$ is computed. A detail of this trial motion is shown in FIG. 6D.

Figure 6E:
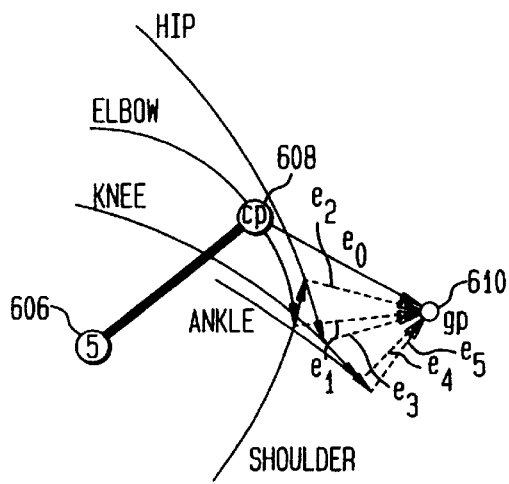
FIG. 6E is a detail of ankle rotation in accordance with the present invention.

As the last approximation step in the contact chain, the rotation of ankle 614 that will move the control point 608 nearest goal point 610 to minimize the residual error vector $e_4$ is computed. A detail of this trial motion is shown in FIG. 6E.

Figure 6F:
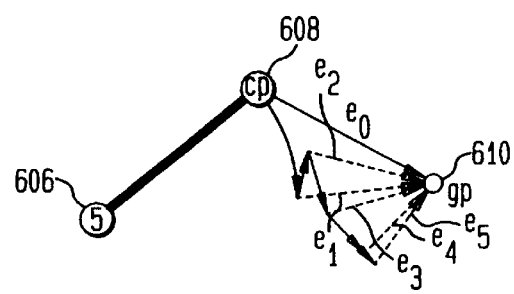
FIG. 6F is a detail of the cumulative positioning of the control point in accordance with the present invention.

The final residual error $e_5$ remaining after the computed motion is shown in FIG. 6F. The result of the tangential synergy computation is a series of joint angle rotations for each joint that drive the control point to the goal point within an error of $e_5$. However, the joints of the articulated character 600 have not actually been physically rotated yet. The tangential synergy is only one of many synergies used to compute joint angle rotations during the limb coordination process.

Due to the distal-to-proximal ordering of computation, at each stage of the successive approximation process, only the distal joints necessary for eliminating the synergy goal error are used to move the control point. For example, if a character's hand is to be positioned using a Position Synergy, for small positioning errors, only the elbow joint moves. However, when the error is larger, more proximal joints such as the shoulder and the waist also contribute rotations to reduce the error. The result is a coordinated motion of the body as a whole that looks very natural.

The distal-to-proximal Joint Coordination rule is only one example of the present successive approximation process Joint Coordination method. In general, any order of joints can be used in the Joint Coordination method. In other words, depending on the task requirements, one can use a proximal-to-distal rule, where the order of joint updates is the reverse of that of the distal-to-proximal rule, a parallel update rule, where all the joints are updated in parallel using the same error vector, or a generalized update rule, where the joints are updated in an arbitrary pre-specified order.

Finally, it should be noted that although the location of the goal point was actually within the reach of the character in the previous example, the tangential synergy computations alone could not move the control point to the desired goal point location in one step. This happens in general because the tangential synergy does not move the control point in reaching motions radially inward or outward towards a goal point, for example, by extending or retracting the arms as humans do. This type of radial motion is essential for producing realistic movements and is accomplished in the present invention by the use of the radial synergy described below.

Radial Synergy Component

Figure 7:
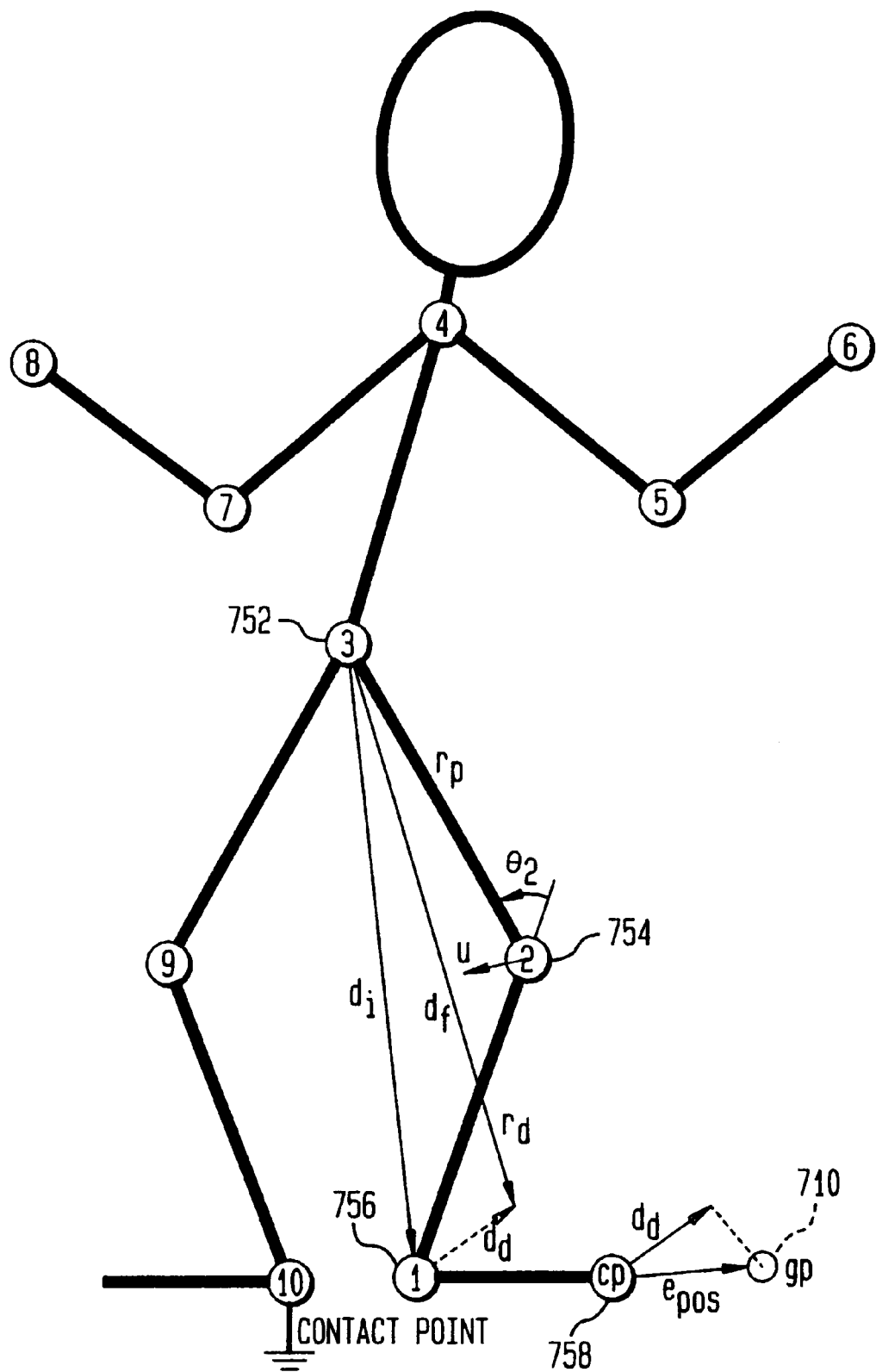
FIG. 7 is an illustration of the Radial Synergy component in accordance with the present invention.

The radial synergy component, illustrated in FIG. 7, is designed to be used in conjunction with the tangential synergy and complements it in functionality. Like the tangential synergy, the goal of the radial synergy is to move the control point 758 to the desired goal point location 710. However, the radial synergy is directed towards extending or retracting the limbs of the body (by rotation of knee joint 754 in FIG. 7) to ensure that the desired goal point location 710 is within the reach of the body so that it can be reached by subsequent application of an associated tangential synergy component.

Unlike the tangential synergy, which rotates joint i to align its r vector with the line segment between joint i and the desired goal point location, the radial (extension) synergy rotates joint i, 754, so that the distance between the next proximal joint 752 and the control point 758 is the same as the distance between the next proximal joint 752 and the desired goal point location 710. If the radial synergy can make these two distances equal, applying the tangential synergy at the next proximal joint will result in an aligning rotation that moves the control point exactly to the desired goal point location. Thus, when coupled with a tangential synergy component at the next proximal joint (or any more proximal joint for that matter), the radial synergy can be a powerful tool for fast and accurate limb coordination.

Radial Synergy Computation

The radial synergy works by moving the control point radially inward or outward to decrease or increase the distance between the control point and the next proximal joint in the body. The next proximal joint means the next joint in the SynJoint list that is relatively proximal to the joint under consideration. For example, in FIG. 7, because the contact point is the character's right foot, the next proximal joint relative to the left knee joint 754 is the left hip joint 752, while the next joint distal to the knee joint is the left ankle joint 756. In order to determine the rotations needed to move the control point 758 to the desired goal point location 710 using the knee 754 and the hip 752 joints, it is best to first use the knee joint 754 to extend or retract the control point 758 so that the toe is as far from the hip as is the desired location. Thereafter, the application of the tangential synergy at the hip joint 752 will rotate the leg so that the toe of the foot is at the desired goal point location.

In FIG. 7, the object of the radial synergy is to rotate the knee joint 754, moving ankle joint 756 until the initial distance $d_i$ is equal to the final distance $d_f$. The distance from the hip to either the control point 758 or the ankle joint 756 may be used in the computations because the movement of each joint is calculated with the other joints held fixed. However, calculations are simpler if the ankle joint 756 is used. In addition, the error vector, $e_{pos}$, is shown in FIG. 7 is for the general three-dimensional case. This 3D error vector, $e_{pos}$, is projected onto the two-dimensional plane of motion defined by the vectors $r_p$ and $r_d$, to form the desired motion vector $d_d$, which is the desired movement of the control point in the plane in which the shin can rotate about the knee. The desired motion vector $d_d$ is then translated to the ankle joint 756 for purposes of calculating $d_f$.

The desired angle for knee joint 754 to rotate in order to translate joint 756 by vector $d_d$ starting from $d_i$ and ending at $d_f$ is computed using standard geometry and trigonometry (law of cosines). The cosine of the desired angle is proportional to the square of the final distance less the squares of the lengths of the next proximal limb and the next distal limb respectively, and inversely proportional to the product of the lengths of the next proximal limb and the next distal limb.

Radial Synergy Joint Coordination

The tangential and radial synergies address the task of moving the control point to the goal point location in a mutually complementary manner. Best results are obtained when these synergy computations are interleaved. Specifically, the ordered list of joints used for the tangential synergy must include the radial synergy joints in the appropriate order so that the radial extension computation at a joint is followed by a tangential positioning computation at the next more proximal joint. As with the tangential synergy, the error vector, e, is updated after computing the rotation for the radial synergy, using the new location of the control point.

As indicated, the body structure is specified in terms of links and joints arranged in a hierarchical tree-like structure. For each type of primary synergy, each joint is tagged as having either tangential or radial synergy components, or both. Thereafter, when the joints are moved by a synergy during the successive approximation process, the previously specified tags are used to invoke relevant tangential and radial synergy components.

Position Synergy

Figure 8:
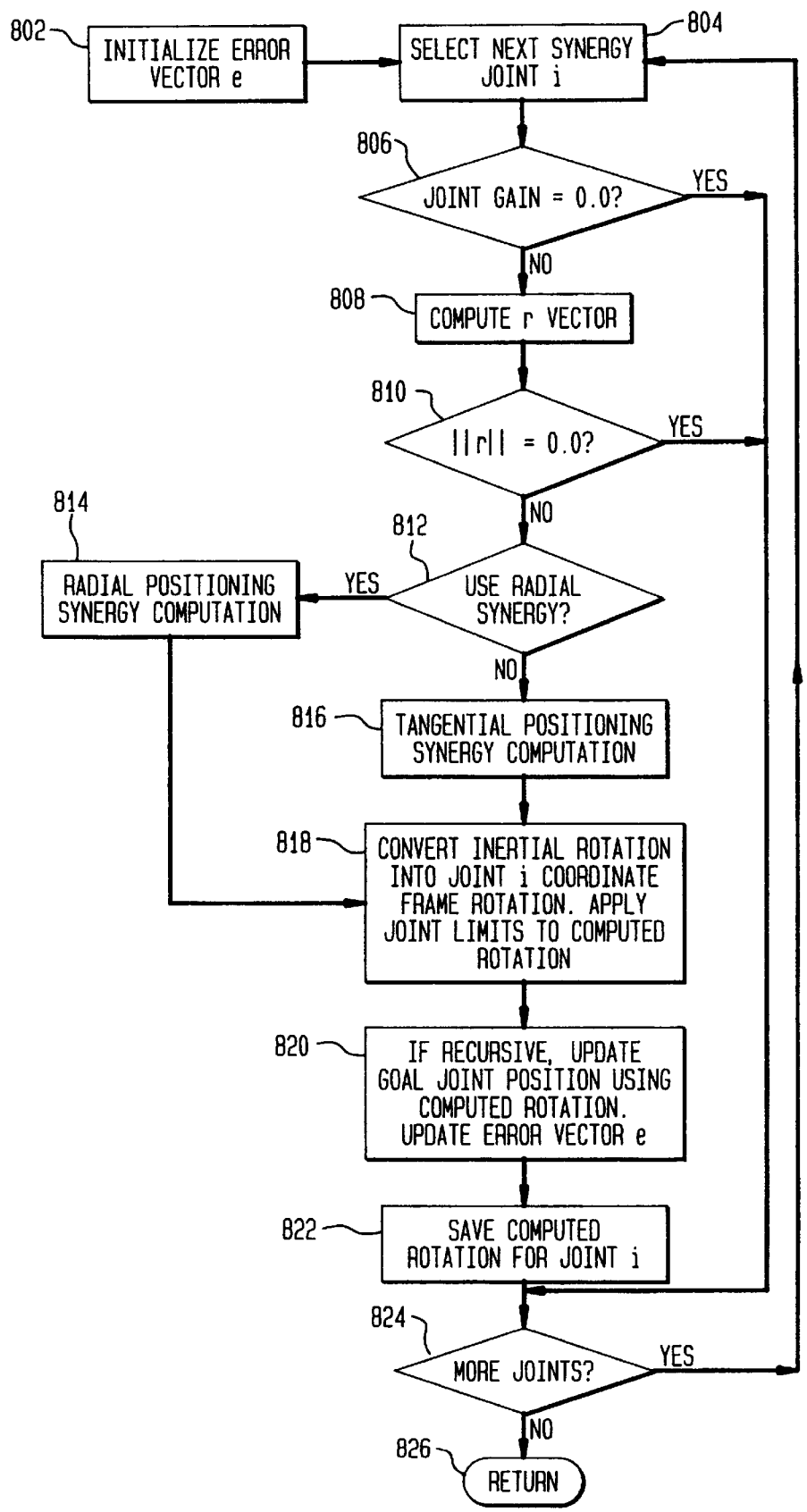
FIG. 8 is a flow chart diagram illustrating the Position Synergy computation in accordance with the present invention.
Figure 9:
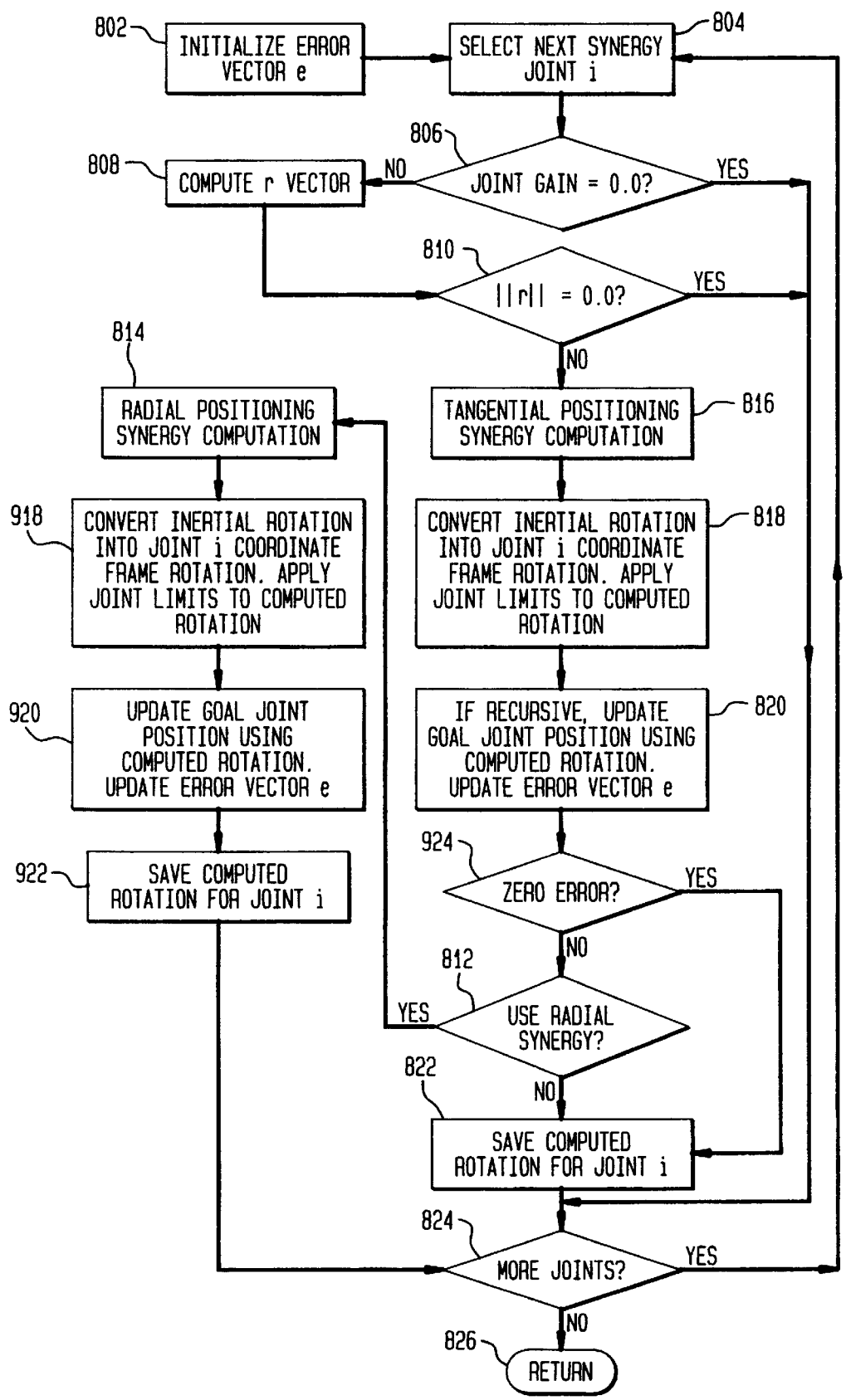
FIG. 9 is a flow chart diagram illustrating an alternative Position Synergy computation in accordance with the present invention.

FIG. 8 is a flow chart diagram of a Position synergy using either tangential or radial positioning components at each joint, but not both. FIG. 9 is a flow chart diagram showing an alternative Position synergy formulation using tangential, or tangential and radial, positioning at each joint. In FIG. 8, an error vector e is initialized at step 802. The next joint is selected at step 804, and the joint gain checked at step 804. If the joint gain is other than zero at step 806, the radial vector r is computed at step 808. The previously specified tag for the joint under consideration is checked at step 812 to determine whether a radial or tangential synergy component should be used. For a radial synergy, the radial component is computed at step 814, otherwise the tangential component is computed at step 816. Using the results of this computation, the error vector is updated by transforming the computed joint rotation as represented in a "global" world coordinate frame of reference into joint rotation in the "local" coordinate flame of the joint at step 818, updating the goal point using the computed rotation at step 820 and storing the computed rotation for the joint under consideration. If there are no more joints to be computed at step 824, the program exits at step 826.

Note that in FIG. 8, each joint is positioned either radially or tangentially but not both. In FIG. 9, tangential positioning is always applied to each joint. After applying the tangential positioning synergy computation to a joint, if the residual error is not zero at step 924, a decision is made as to whether to apply the radial synergy to the joint under consideration at step 812 based on the tags for that joint. If the radial synergy tag is present, the radial synergy component computation is carried out at step 814. Thereafter, the error vector is updated by transforming the computed joint rotation as represented in a "global" world coordinate frame of reference into joint rotation in the "local" coordinate frame of the joint at step 918, updating the goal point using the computed rotation at step 920 and storing the computed rotation for the joint under consideration at step 922 in a manner similar to steps 818, 820 and 822 respectively. If there are no more joints to be computed at step 824, the program exits at step 826.

Balance Synergy

Figure 10:
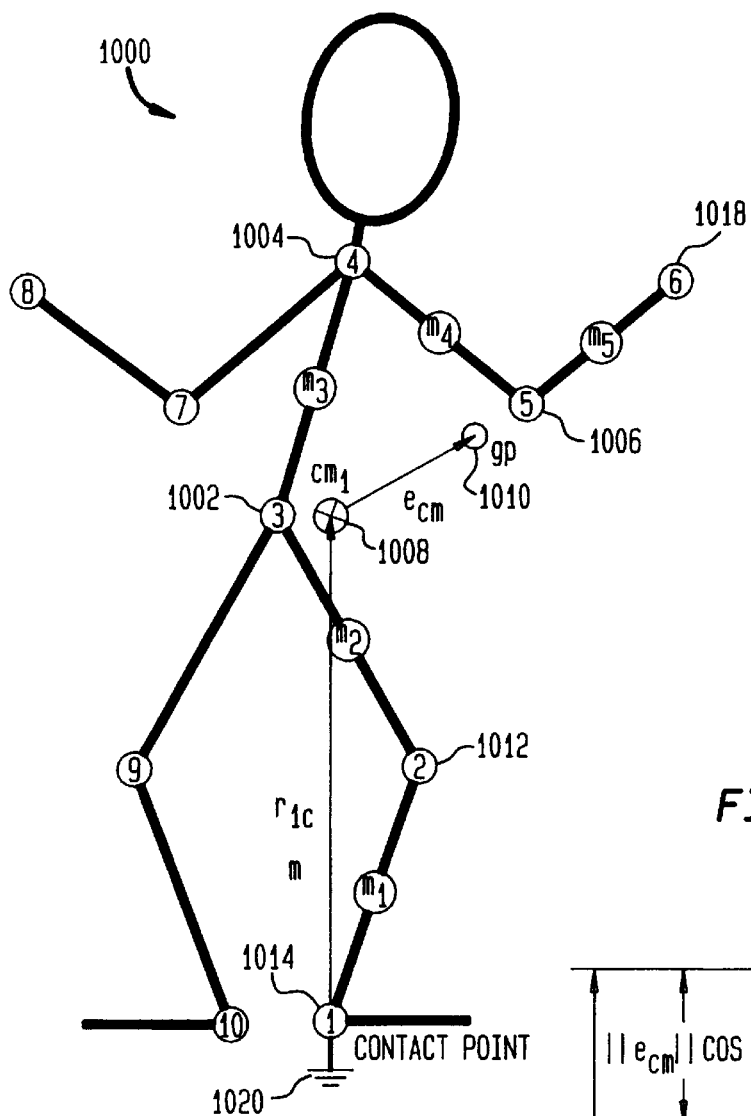
FIG. 10 is a stick figure illustration of the Balance Synergy in accordance with the present invention.

An example of the Balance synergy is shown in FIG. 10. The object of the Balance synergy is to position the center-of-mass of the body at a desired goal point location relative to the contact point. Values for the desired goal point are provided to the Balance synergy by higher-level behaviors and tasks. As with the Position synergy, the Balance synergy goal point can be specified relative to an arbitrary coordinate frame of reference. FIGS. 10 and 10A–G show Balance synergy computations similar to that of a tangential Position synergy, with two important differences: 1) the Balance synergy takes into account the mass of the limbs, and 2) there is not a single control point or goal point, but instead, a collection of control points and goal points, one associated with each joint.

At each joint, the Balance synergy computes joint angle rotation commands that attempt to minimize the length of the overall synergy error vector defined by the error between the desired location for the center-of-mass of the entire body (the "synergy goal point") and the body's actual center-of-mass location. The control point location for each joint (the "joint control point") is the location of the center-of-mass of the portion of the body distal to the respective joint, whereas the goal point for each joint (the "joint goal point") is the location of the center-of-mass distal to that joint translated by the overall synergy error vector.

The Balance synergy computation takes place in a manner similar to that previously described for a tangential synergy, with the exception that a different definition of the radius vector is used. In the tangential synergy, the radius vector points from the joint to be rotated to the control point, where such control point is usually a fixed point on the character's body. In the Balance synergy the radius vector used points from the joint to be rotated to the instantaneous location of the center-of-mass of the portion of the character's body that is distal to that joint.

Balance Synergy Computation

In particular, in FIG. 10 an articulated character 1000 is shown having 10 joints, a head and 11 body links. Each link is assigned a mass, $m_1$, $m_2$, $m_3$, $m_4$, and $m_5$, approximated as a point mass at the center of each link. In addition, each joint also is assigned a joint control point which is located at the position of the center-of-mass of the portion of the body distal to that joint. In this example, the objective of the Balance synergy is to move the center-of-mass (cm) of the entire body 1008 to the location of the synergy goal point 1010. The problem to be solved is to compute the joint angle rotation commands for each joint 1006, 1004, 1002, 1012 and 1014, which minimizes the length of the error vector 1016.

Figure 10A:
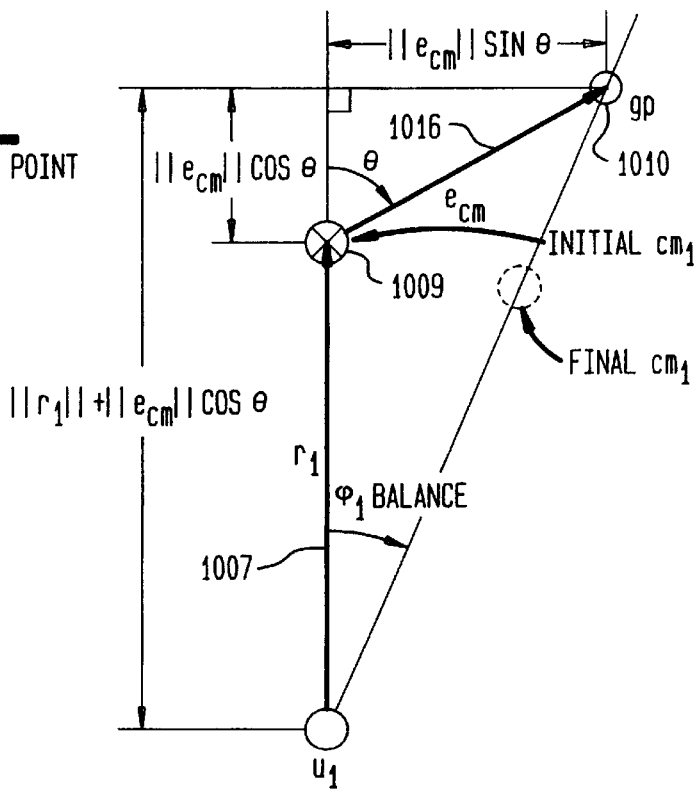
FIG. 10A is a detail diagram of the rotation of joint 1 of FIG. 10 in accordance with the present invention.

A detail of limb coordination using the Balance synergy is shown in FIG. 10A. In particular, FIG. 10A depicts the center-of-mass 1009 of all the links of the body distal to ankle joint 1014 of the articulated character 1000. The Balance synergy computes the joint angle rotation command for the ankle joint 1014 which moves the distal center-of-mass 1009 such that it is nearest the distal center-of-mass goal point 1010 to minimize error vector 1016. The distal center-of-mass goal point (the "joint goal point") for the ankle joint 1014 is defined as the vector sum of $r_1$ (1007) and $e_{cm}$ (1016).

FIG. 10A illustrates the two vectors used in the Balance synergy computations: a radius vector $r_1$, from the joint 1014 to be rotated to the distal center-of-mass control point 1009, and an error vector 1016 from the center-of-mass of the entire character's body 1008 to the associated synergy goal point location 1010. It so happens that in this example the center-of-mass distal to the ankle joint 1009 and the center-of-mass 1008 of the entire character's body are co-located, which is not usually the case. The above mentioned radius and error vectors are used by the Balance synergy to compute joint angle rotation commands comprised of an axis of rotation and an angle of rotation (often collectively referred to as a "quaternion"). The rotation axis for each joint is orthogonal to the associated radius vector and the synergy error vector 1016. The angle of rotation for a joint 1014 is computed using standard geometry and trigonometry. The tangent of the desired joint angle rotation at each joint is proportional to the magnitude of the vector product of the associated radius vector and the error vector, and inversely proportional to the square of the radius vector. If the synergy goal point is outside the range of the character, the Balance synergy will cause the actual center-of-mass to be moved as close to the location of the desired synergy goal point as physically possible.

As the Balance synergy moves center-of-mass 1008 towards the synergy goal point 1010, the movement of the affected joints will be coordinated by a successive approximation process having at least tangential, and possibly radial, components. The tangential component of the Balance synergy uses circular arc trajectories of the distal center-of-mass at a radius $r_i$ from each joint (assuming all other joints are held stationary) to determine the joint angle rotations that minimize the error vector 1016. Similar circular arc center-of-mass trajectories at corresponding radii from joints 1014, 1012, 1002, 1004 and 1006 (ankle, knee, shoulder and elbow) are scribed by their respective joint rotations to individually minimize the error vector 1016.

The rationale for the tangential component of the Balance synergy is as follows: Because all other joints are held motionless, the only possible movements of a particular joint control point (distal center-of-mass) are rotations about joint i. This implies that by moving only joint i, the distal center-of-mass can be located at some point on a sphere centered at joint i. The point on this sphere closest to the goal point for joint i lies on the line joining joint i and the desired joint goal point location. Therefore, as illustrated in the example in FIG. 10A, the Balance synergy computes the joint angle rotation commands that move the distal center-of-mass to lie on this line.

Figure 10D:
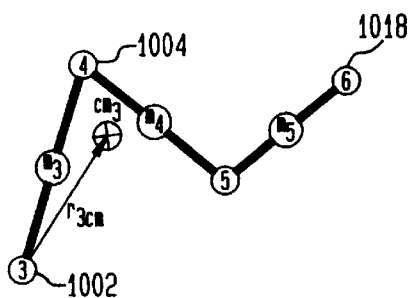
FIG. 10D is an upper body detail of the body of stick figure illustration of FIG. 10 in accordance with the present invention.
Figure 10E:
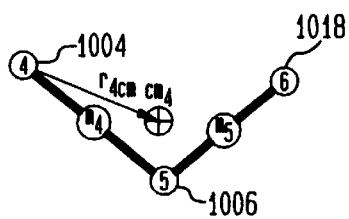
FIG. 10E is an arm detail of the body of stick figure illustration of FIG. 10 in accordance with the present invention.
Figure 10F:
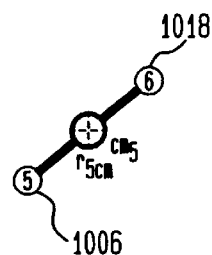
FIG. 10F is a forearm detail of the body of stick figure illustration of FIG. 10 in accordance with the present invention.
Figure 10C:
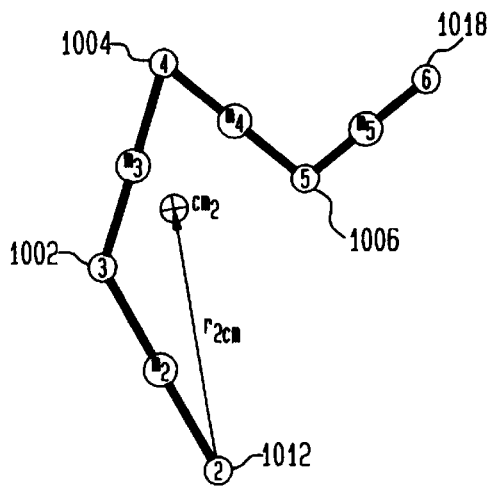
FIG. 10C is a partial body detail of the body of stick figure illustration of FIG. 10 in accordance with the present invention.
Figure 10G:
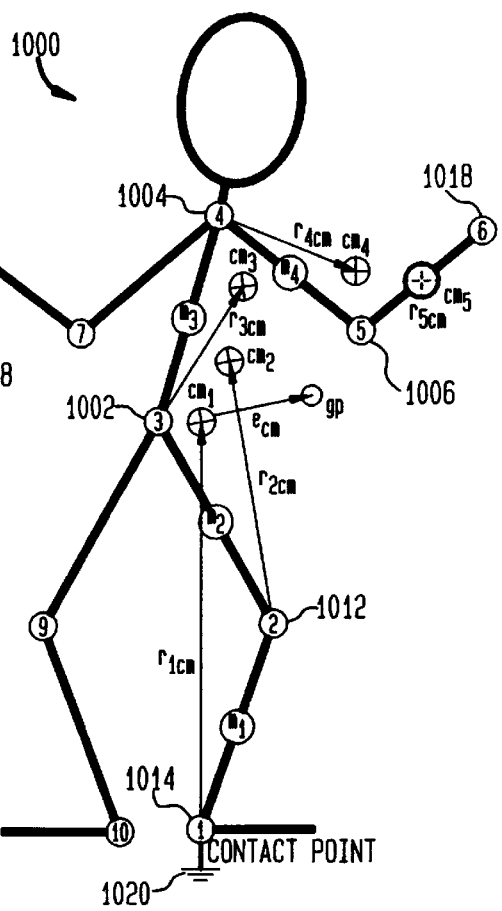
FIG. 10G is a detail of the relative locations of the distal center-of-mass of each joint in the body of the stick figure illustration of FIG. 10 in accordance with the present invention.
Figure 10B:
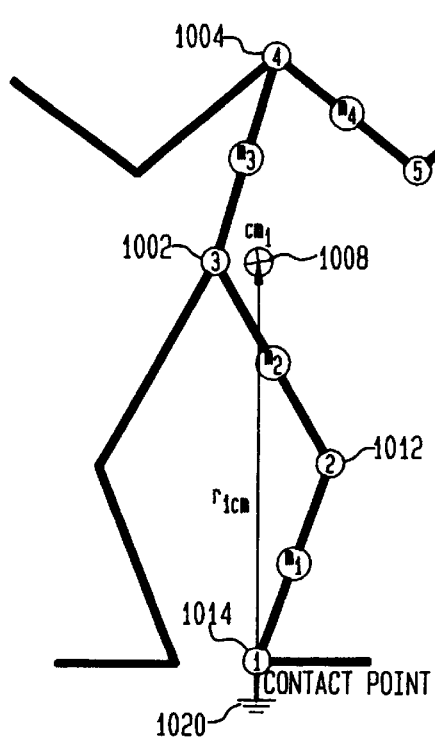
FIG. 10B is a detail of the body of stick figure illustration of FIG. 10 in accordance with the present invention.

For example, one arc is the circular trajectory at a radius $r_{3c}$ from joint 1002 (hip) shown in FIG. 10D, as joint 1002 is rotated (assuming all other joints are held stationary, i.e., joints 1004 and 1006 are held frozen or motionless) so as to minimize error vector 1016. Similar circular trajectories at radii $r_{1c}$, $r_{2c}$, $r_{4c}$ and $r_{5c}$ from ankle joint 1014 (FIG. 10B), knee joint 1012 (FIG. 10C), shoulder joint 1004 (FIG. 10E) and elbow joint 1006 (FIG. 10F), respectively are scribed for each of the other joints to individually minimize the error vector 1016. FIG. 10G shows, for the articulated character in FIG. 10, the relative locations of the distal center-of-masses for each joint, their respective radius vectors, the synergy goal point and the synergy error vector. Each such rotation of the joints, independent of the other joints, is a trial motion forming a successive approximation to the final motion to be used in rendering the video image.

Radial synergy components also can be computed for the Balance synergy in a manner similar to the radial synergy components for the position synergy disclosed herein, above, using the radius and error vectors defined for the tangential components of the Balance synergy along with the specifications for joint control points and joint goal points.

Balance Synergy Joint Coordination

Figure 11A:
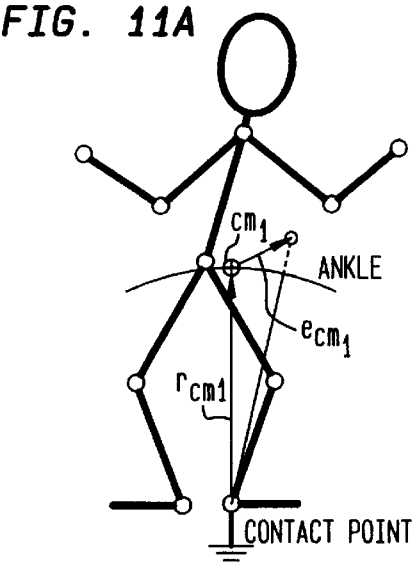
FIG. 11A is a detail of ankle rotation in accordance with the present invention.

FIGS. 10, and 11A through 11E illustrate the proximal-to-distal Joint Coordination carried out by the Balance synergy. The proximal-to-distal order of joints is ankle 1014, knee 1012, hip 1002, shoulder 1004 and elbow 1006. As a first step in the successive approximation process, the rotation of ankle 1014 that will position the joint control point $cm_1$ nearest its goal point, in this case 1010, to minimize the synergy error vector $e_{cm}$ 1016 is computed. This allows a new error, $e_1$ to be computed. A detailed drawing of the trial motion of the ankle joint is shown in FIG. 11A.

Figure 11B:
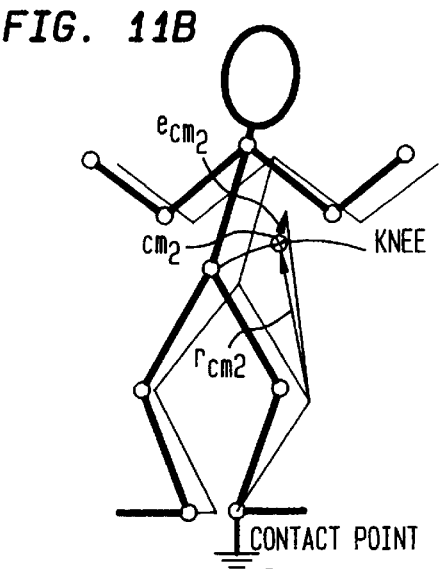
FIG. 11B is a detail of knee rotation in accordance with the present invention.

As a next step in the approximation, the rotation of knee 1012 that will position the control point $cm_2$ nearest its joint goal point 1010 (obtained by the vector addition of $r_2+e_1$) to minimize the residual error vector $e_1$ is computed. This allows a new error, $e_2$ to be computed. A detail of the trial motion of the knee joint is shown in FIG. 11B.

Figure 11C:
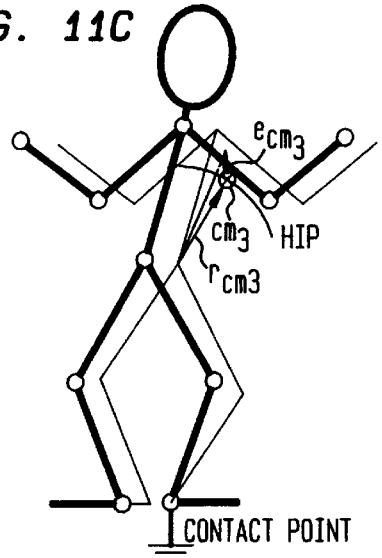
FIG. 11C is a detail of hip rotation in accordance with the present invention.

As a next approximation, the rotation of hip 1002 that will position the control point $cm_3$ nearest its joint goal point 1010 (obtained by the vector addition of $r_3+e_2$) to minimize the residual error vector $e_3$ is computed. This allows a new error, $e_3$ to be computed. A detail of the trial motion is shown in FIG. 11C.

Figure 11D:
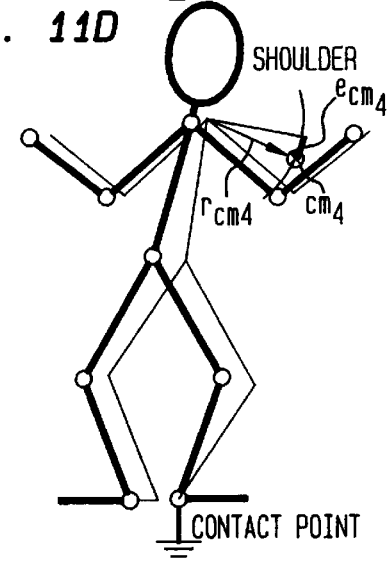
FIG. 11D is a detail of shoulder rotation in accordance with the present invention.

As a next approximation, the rotation of shoulder 1004 that will position the control point $cm_4$ nearest its joint goal point 1010 (obtained by the vector addition of $r_4+e_3$) to minimize the residual error vector $e_3$ is computed. This allows a new error, $e_4$ to be computed. A detail of the trial motion is shown in FIG. 11D.

Figure 11E:
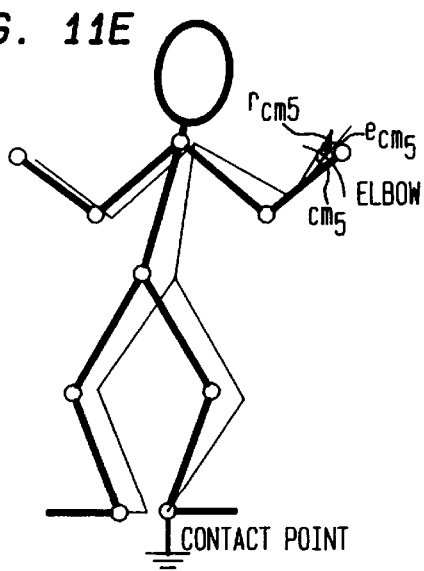
FIG. 11E is a detail of elbow rotation in accordance with the present invention.
Figure 11F:
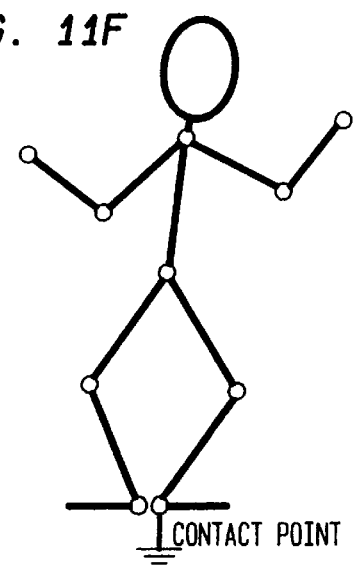
FIG. 11F is the final posture position of the stick figure of FIG. 11 after using the Tangential Synergy component of the Balance Synergy in accordance with the present invention.

As the last approximation in the CG chain, the rotation of elbow 1006 that will position the control point $cm_5$ nearest its joint goal point 1010 (obtained by the vector addition of $r_5+e_4$) to minimize the residual error vector $e_4$ is computed. A detail of this trial motion is shown in FIG. 11E. FIG. 11E illustrates the final residual error vector $e_5$. FIG. 11F shows the final body posture. The result of the balance computation is a series of joint angle rotations for each joint which will move the center of mass of the entire body to the synergy goal point location within an error of $e_5$.

Figure 12:
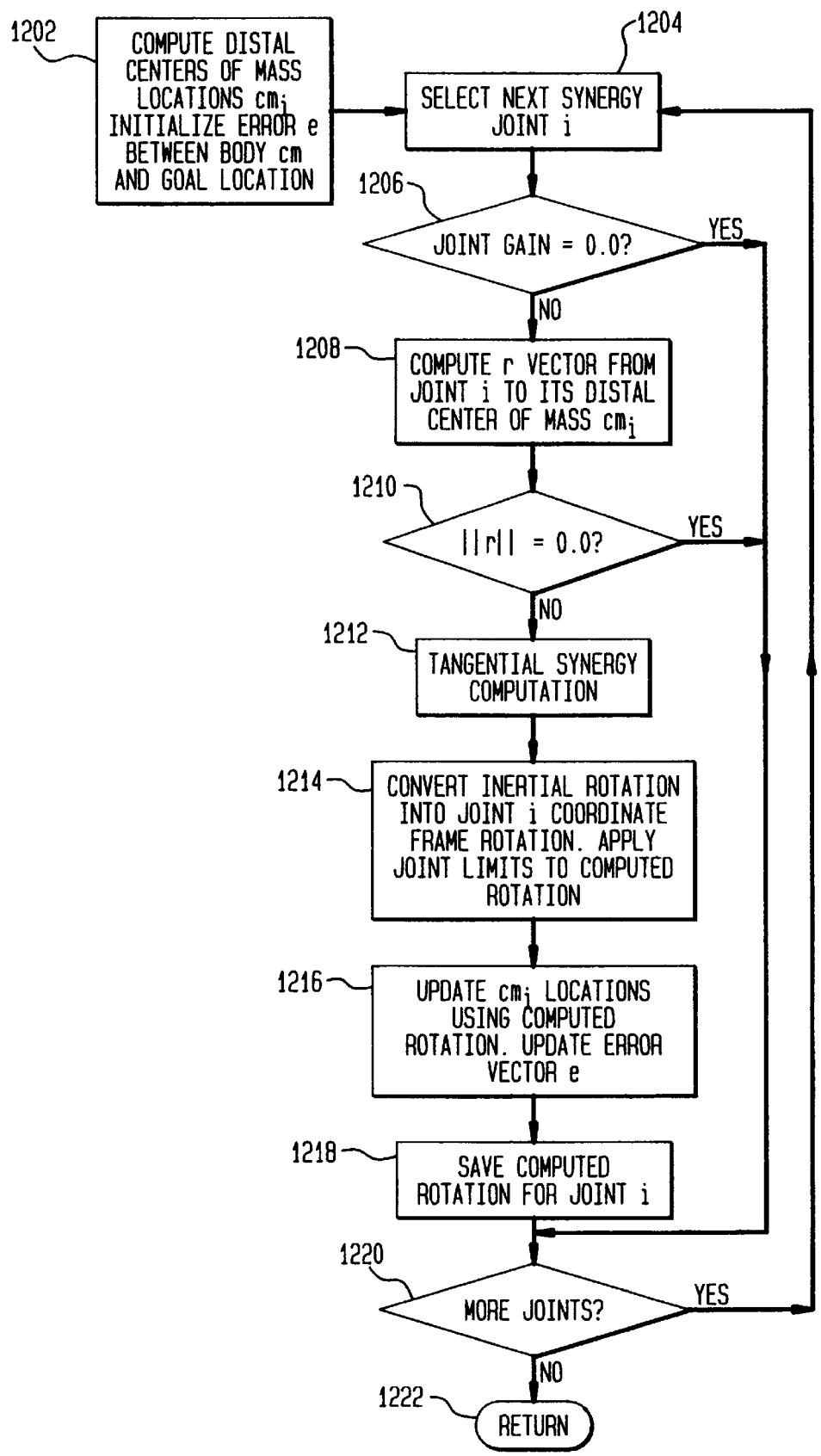
FIG. 12 is a flow chart diagram of the Balance Synergy computation in accordance with the present invention.

FIG. 12 shows a flow chart diagram of the Balance synergy computations. In FIG. 12 all the distal centers of mass locations are computed for the current body posture and an error vector e is initialized at step 1202. The next joint is selected at step 1204, and the joint gain checked at step 1206. If the joint gain is other than zero at step 1206, the radial vector r is computed at step 1208. If the length of r is zero at step 1212, the computation skips to the next joint. Otherwise, a tangential synergy computation is performed at step 1214 using the r and e vectors to minimize the error vector e. Using the results of this computation, the error vector is updated by transforming the computed joint rotation as represented in a "global" world coordinate frame of reference into joint rotation in the "local" coordinate frame of the joint at step 1216, updating the goal point using the computed rotation at step 1218 and storing the computed rotation for the joint under consideration at step 1220. If there are more joints to be processed at step 1222, the program repeats the computation from step 1406 for the next joint. Otherwise it exits at step 1224.

Joints in the Balance synergy also can be coordinated using the distal-to-proximal rule described previously for the tangential positioning synergy. However, as indicated for the other synergies, the selected order of the joints in the present method of successive approximation, need not always be proximal-to-distal, and a joint coordination mechanism can be selected based on the task requirements. For the Balance synergy, a proximal to distal order of successive approximation will generally produce more natural body motion, but the computational overhead will be higher than for distal-to-proximal order of successive approximation. Parallel computation can be used as well.

As indicated for the other synergies, each joint angle rotation computed by the Balance synergy, independent of the movements of the other joints, is a trial motion forming a successive approximation to the final motion to be rendered in the video image. That is, during each step of the successive approximation process, the video image is not changed. Instead, a phantom movement for that joint is recorded in computer memory. Even after each synergy computes all its joint angle movement commands, the video image is still not changed. The joint movement commands computed for each synergy must be coordinated with the joint angle movement commands computed for the other synergies through the Synergy Coordination process 18 in FIG. 2 to form the final joint angle rotation commands applied to the character's body. After applying the final joint angle movement commands to the characters body, the position and orientation of the character's body is updated in memory by the body kinematics and image subsystem 16, then graphically rendered to the display screen as a video image.

Posture Synergy

The posture synergy is a generalization of a keyframe and is used to maintain the character's body in a specified goal posture (i.e. predetermined joint angle configuration) in the face of disturbances. A goal posture is defined by specifying the desired joint angles for all the joints contributing to a Posture synergy. The goal posture may vary over time or it may remain fixed.

Posture Synergy Computation

In humans, the body's limbs return to a natural position whenever the muscles attached to the limbs relax. This natural relaxed position is called a posture. The Posture synergy calculates joint angle movement commands necessary to return the body to a specified posture.

There are two modes of operation for the Posture synergy. In the first mode, called the "snap to" mode, the synergy joints instantaneously snap to their desired values. The snap to mode is useful if the body is to be set into some desired configuration. In the second mode, called the "filter" mode, the error between the goal joint position and the actual joint position is passed through a filter to determine the rotation. For example, using a zero$^{th}$ order filter permits disturbance rejection by always trying to reduce the error between the current posture and the desired posture by an amount proportional to the error. Such a simple filter is like the restoring force exerted by a spring when deformed. A spring constant, k, controls how weak or strong the disturbance rejection will be. Higher-order filters can be used to produce more complex dynamic responses.

Figure 13:
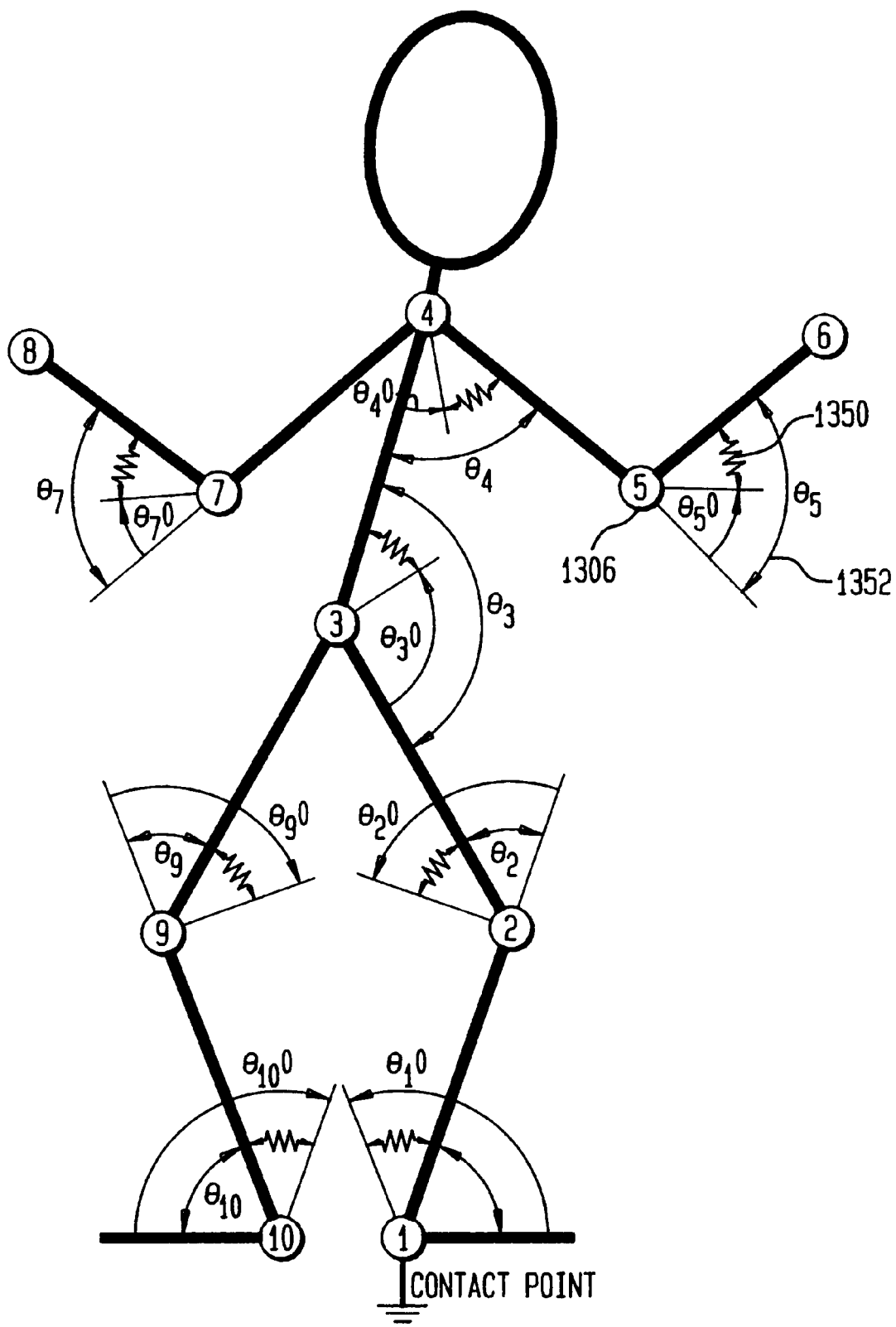
FIG. 13 is a stick figure illustration of the Posture Synergy in accordance with the present invention.

The spring analogy of the posture synergy is illustrated in FIG. 13. Each of the joints tends to rotate to a natural posture. The returning force is illustrated by a spring which tends to rotate the joint. The returning force of a spring is proportional to the displacement of the spring, either by compression or extension. For example, the elbow joint 1302 has a natural angle when the arm is relaxed. When the arm is in a flexed position at angle 1352, as shown in FIG. 13, the posture synergy imposes a spring force 1350 which exerts a force so as to rotate joint 1306 towards its natural angle.

Posture Synergy Joint Coordination

Figure 14:
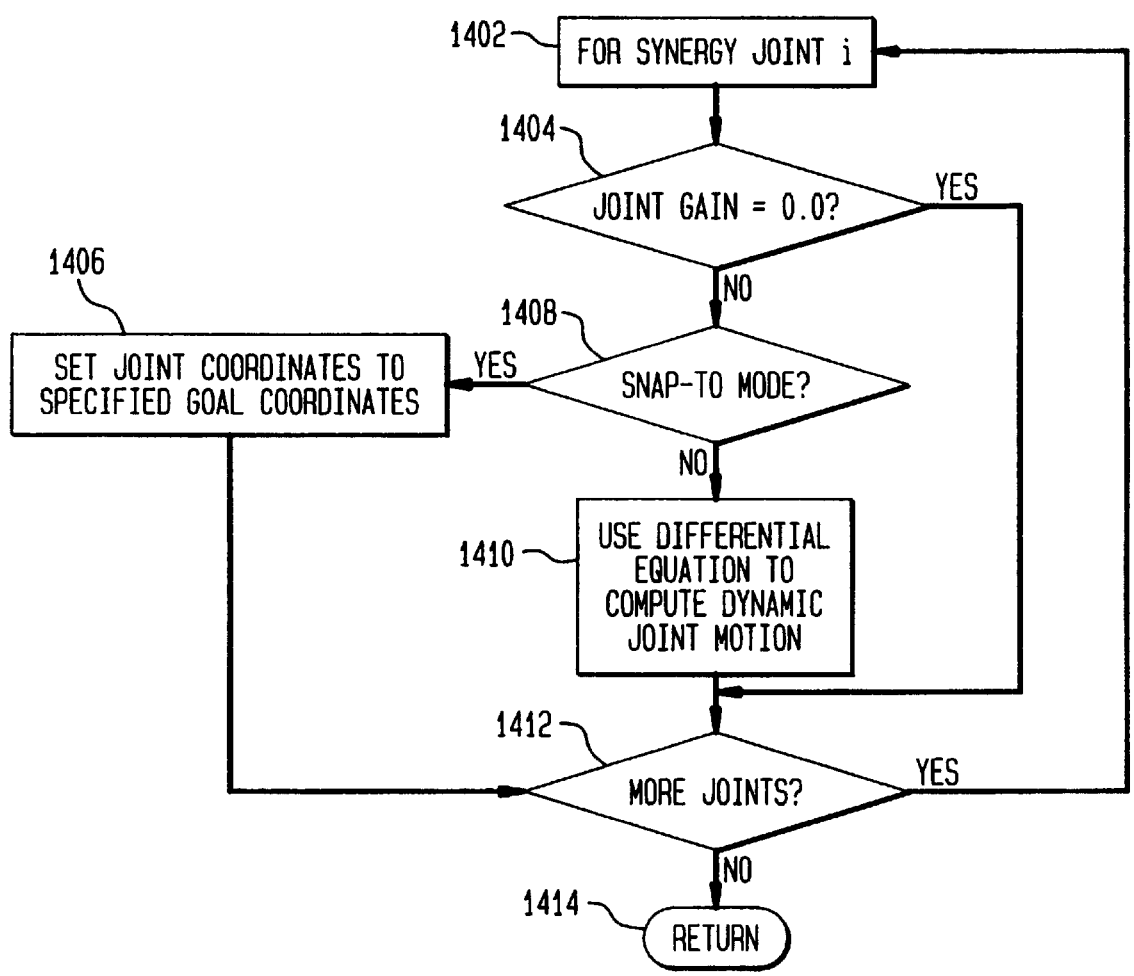
FIG. 14 is a flow chart diagram of the Posture Synergy computation in accordance with the present invention.

In the Posture synergy, the joints have independent goals. Therefore, in this synergy, joint coordination is not an issue and joint rotations can be updated in an arbitrary order. A flow chart for the Posture synergy is shown in FIG. 14. For each synergy joint at step 1402, the joint gain is checked at step 1404. Where the joint gain is non-zero, and the snap to mode is enabled, a set of specified joint coordinates is generated at step 1406. If snap to mode is not enabled, then a spring equation or other filter is used to compute the joint coordinates at step 1410. When all joints have been processed and there are no more joints at step 1412, the program returns at step 1414.

Alignment Synergy

In many body movements, it is often desirable to align specific parts of the body in particular directions. For example, coordinating the movement of the head during walking to stabilize vision. To hold the head steady, the neck joint rotates so that the head is aligned in a vertical direction. If a character is walking over uneven terrain, the foot needs to be aligned with the ground plane. The Alignment synergy is used in these behaviors to satisfy such alignment goals. The Alignment synergy specifies a control link and a goal direction. The control link is a part of the body between a specified pair of proximal and distal control joints. The goal direction is specified by the coordinates of a unit vector. The Alignment synergy produces joint rotations which tend to align the control link in the direction of the goal unit vector.

Due to the way the control link is defined, several connected links of the body can be aligned using this synergy by specifying their bounding joints. For example, the whole arm can be aligned by specifying the shoulder and the wrist as the proximal and distal control joints, respectively. Rotations of joints proximal to the proximal control link will play a key role in aligning the goal link.

Figure 15:
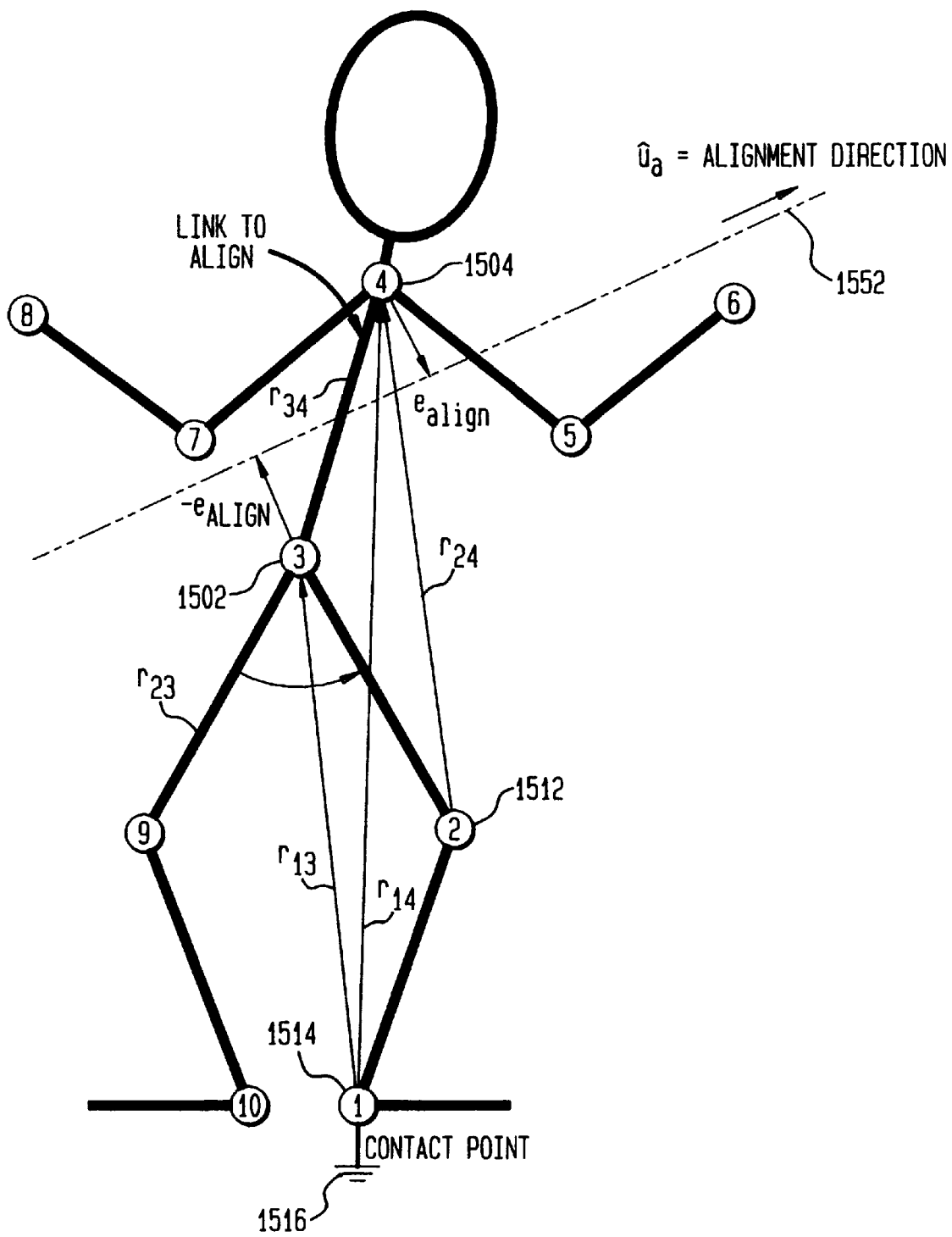
FIG. 15 is a stick figure illustration of the Alignment Synergy in accordance with the present invention.

The Alignment synergy is illustrated in FIG. 15. The control link is $r_{34}$. The goal direction (unit vector) is shown as a direction 1552. The vectors $e_{align}$ represent the error by which the control link must be rotated to align it with desired goal direction 1552.

Alignment Synergy Computation

Two different methods can be used to compute the rotations required to align the control link with the direction specified by the goal unit vector. The first method is based on setting positioning goals for the proximal and distal control joints. The second method is based on directly rotating the joints proximal to the proximal and distal control joints.

In FIG. 15, r represents the radius vector from the proximal control joint to the distal control joint as shown. In the rotation-based method, for a given r vector, the rotation required of any synergy joint proximal to the proximal control joint for alignment is directly proportional to the vector product of the square of the r vector and the goal unit vector, and inversely proportional to the square of the absolute value of the r vector. The positioning-based method is based on converting the alignment error into a positioning error for the proximal and distal control joints. That is, joints 1504 and 1502 are considered to have positioning error vectors, $e_{align}$ and $-e_{align}$, respectively. Position synergies with both tangential and radial components can be used to position joints 1504 and 1502 to minimize their respective error vectors. The rotation of the ankle joint 1514 which will minimize the error is proportional to the difference between the ratio of $r_{13}$ to the square of the absolute value of $r_{13}$ and ratio of $r_{14}$ to the square of the absolute value of $r_{14}$ times the error vector $e_{align}$. Similarly, the rotation of the knee joint 1512 which will minimize the error is proportional to the difference between the ratio of $r_{24}$ to the square of the absolute value of $r_{24}$ and ratio of $r_{14}$ to the square of the absolute value of $r_{14}$ times the error vector $e_{align}$.

Alignment Synergy Joint Coordination

Figure 16:
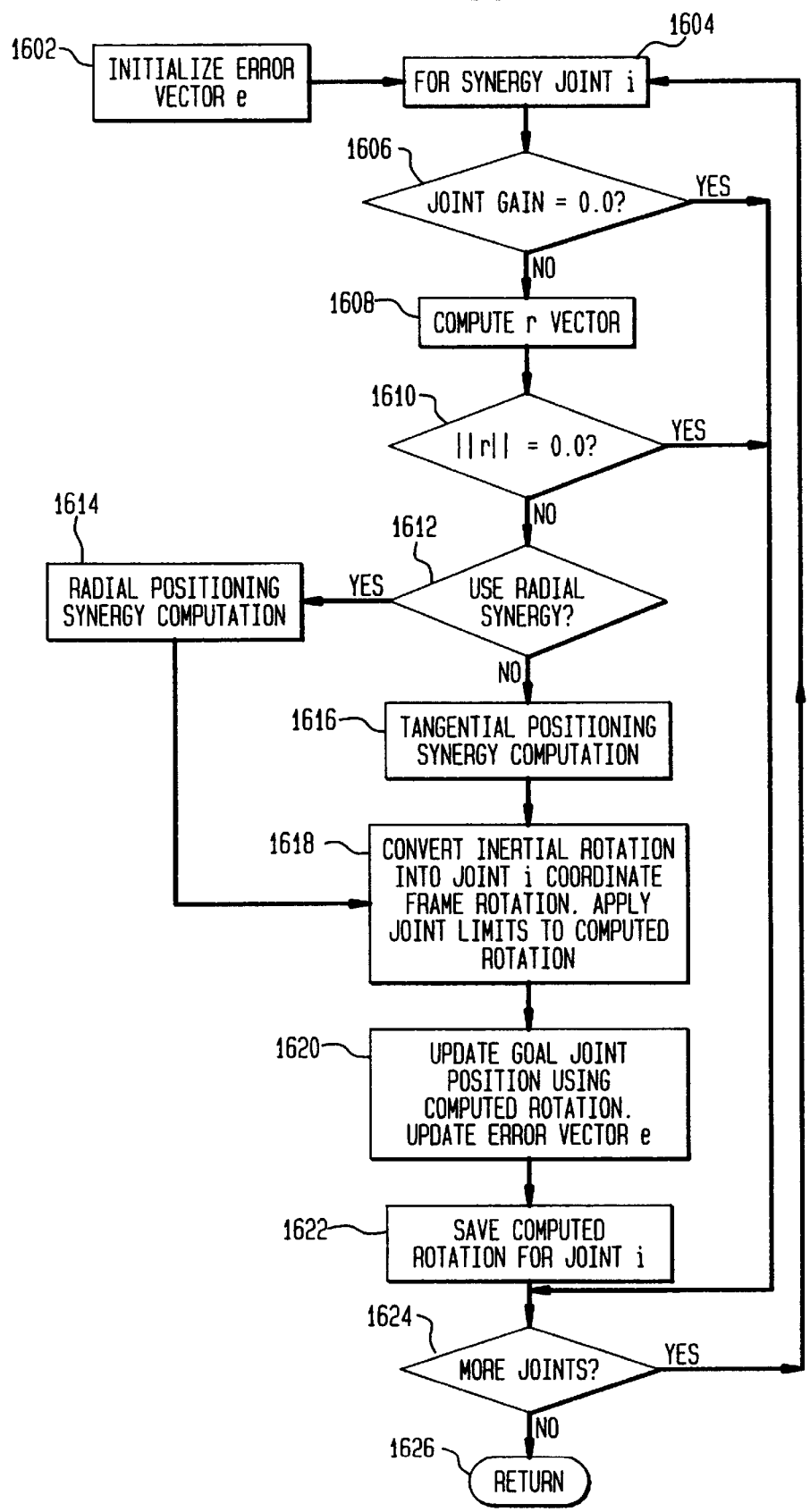
FIG. 16 is a flow chart diagram illustrating the Alignment Synergy computation in accordance with the present invention.

As with the Position synergy, the Alignment synergy can benefit from the distal-to-proximal ordering of computation. For this, after each step, the rotation computed by the Alignment synergy is applied to obtain updated radius and error vectors used for computing the alignment rotation at the next synergy joint. Other ordered Joint Coordination schemes, as previously discussed, also can be used. A flow chart for the Alignment synergy is shown in FIG. 16.

Avoidance Synergy

Figure 17:
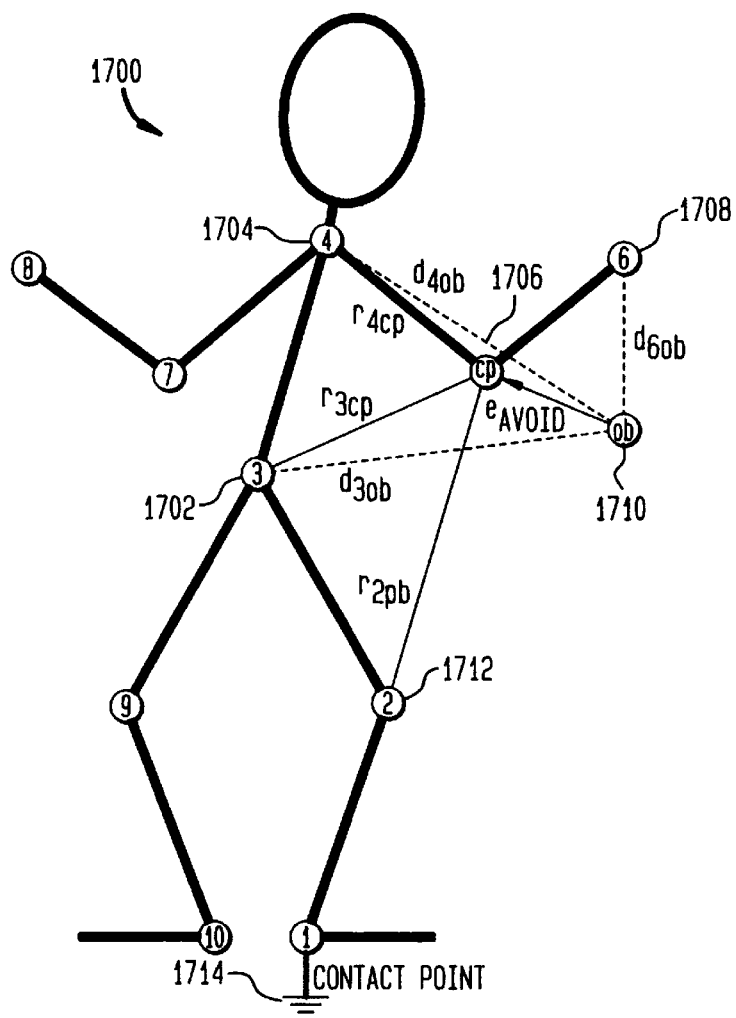
FIG. 17 is a stick figure illustration of the Avoidance Synergy in accordance with the present invention.

As shown in FIG. 17, the goal of the Avoidance synergy is to keep the body away from a specified avoidance location or obstacle 1710 in space. The Avoidance synergy works by determining the point on the body 1706 closest to the obstacle (the control point) and moving the control point 1706 away from the obstacle 1710 in a repulsive manner. In this sense, the Avoidance synergy is like the inverse of the Position synergy which moves the control point to the specified goal point location in an attractive manner. An assumption is made that the specified avoidance location 1710 repels the control point 1706 according to some predetermined function, typically a function of the respective relative locations of the control point and the avoidance location in space.

Avoidance Synergy Computation

The avoidance error vector $e_{avoid}$ is computed using a predefined function of the distance between the character and the avoidance location. This function is specified as part of the synergy specification. The synergy specification also includes a method of determining the control point. Usually, the character's joint that is close to the avoidance location is used as the control point The avoidance error vector is equal to the predefined function times the distance vector from the avoidance location to the control point, divided by the distance. Typically, an inverse square function of the distance is used, that is, the predefined avoidance function is one over the square of the distance from the avoidance location to the control point. As the distance to the avoidance location becomes small, the error generated by the predefined avoidance function becomes large.

Figure 18:
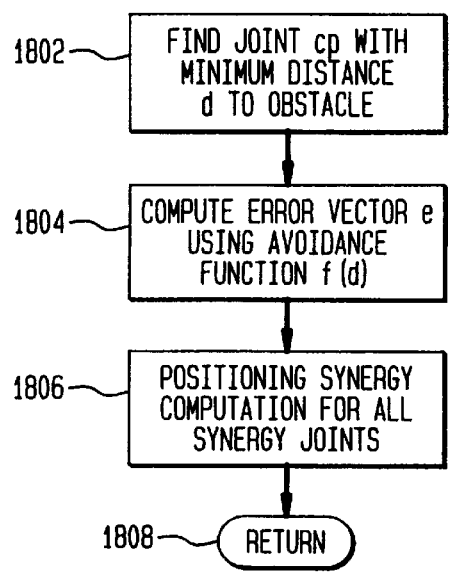
FIG. 18 is a flow chart diagram illustrating the Avoidance Synergy computation in accordance with the present invention.

The avoidance error vector drives the positioning of the control point using computations similar to the Positioning synergy, and can have tangential and radial components. Also, with regard to Avoidance synergy Joint Coordination, the joint coordination schemes used are similar to those which can be used with Position synergies. A flow chart for the Alignment synergy is shown in FIG. 18.

Synergy Groups

Synergies are organized into Groups called SynGroups. A SynGroup is a collection of synergies associated with a particular contact point that contributes to some larger scale task and serves to define the relative priority of each synergy for that task. When a SynGroup is activated during character animation, it attempts to simultaneously satisfy the goals of all of the synergies in the group using the Synergy Coordination mechanism 18. Syngroups are activated by behaviors, which are in turn activated by higher-level motor tasks. Behaviors provide synergy goals with values, set priorities and adjust synergy strengths and gains. The synergies then produce joint angle rotations that serve to satisfy their individual goals.

Synergy Coordination

The Synergy Coordination process determines the relative contribution of each synergy to the overall movement. Through the combination of joint angle rotations from each active synergy, behavioral animation is produced that attempts to satisfy multiple goals and constraints. The Synergy Coordination process can consist of, for example, weighted sum, prioritization and winner-take-all combination schemes as illustrated in FIGS. 19A, 19B and 19C respectively.

Figure 19A:
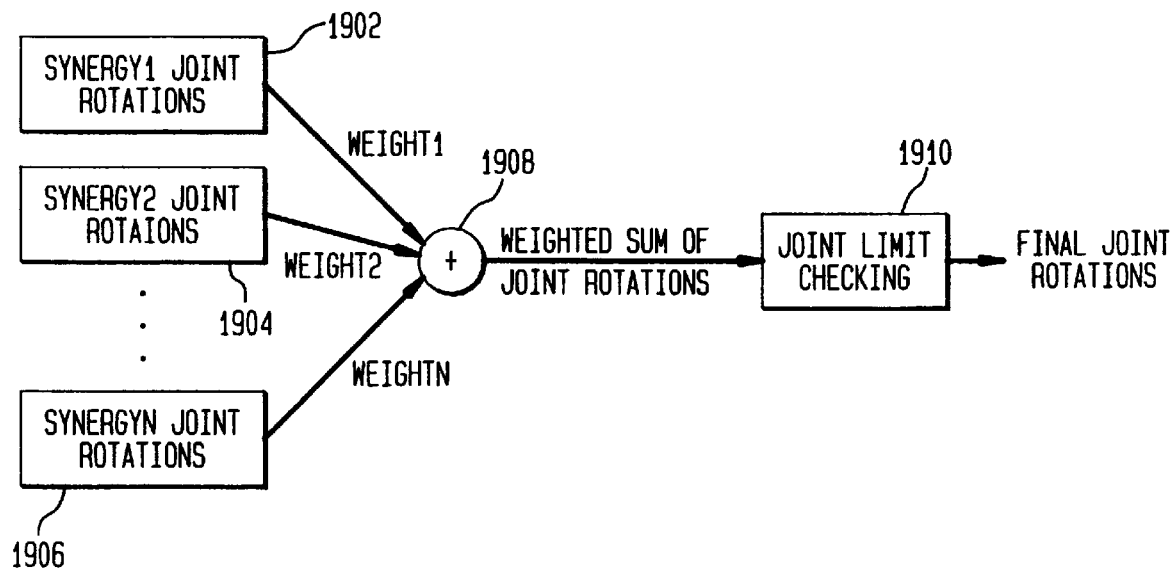
FIG. 19A is a flow chart diagram illustrating a weighted sum Synergy Coordination process in accordance with the present invention.
Figure 19B:
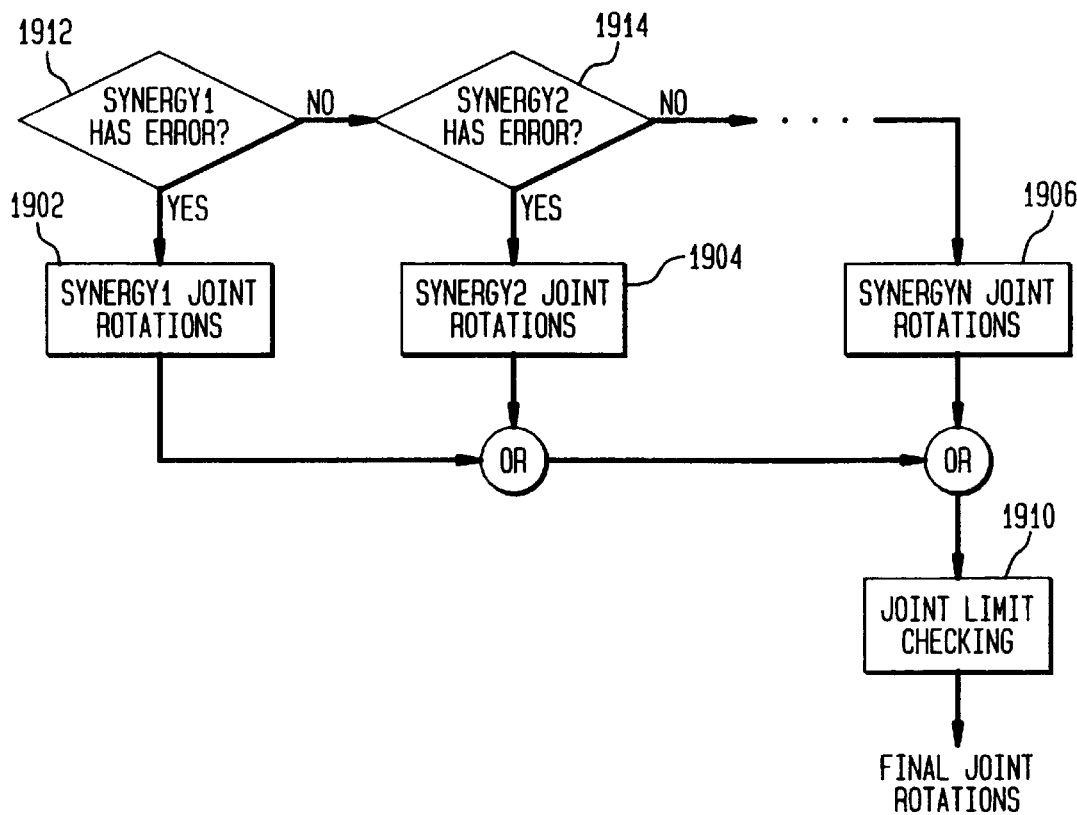
FIG. 19B is a flow chart diagram illustrating a prioritization Synergy Coordination process in accordance with the present invention.
Figure 19C:
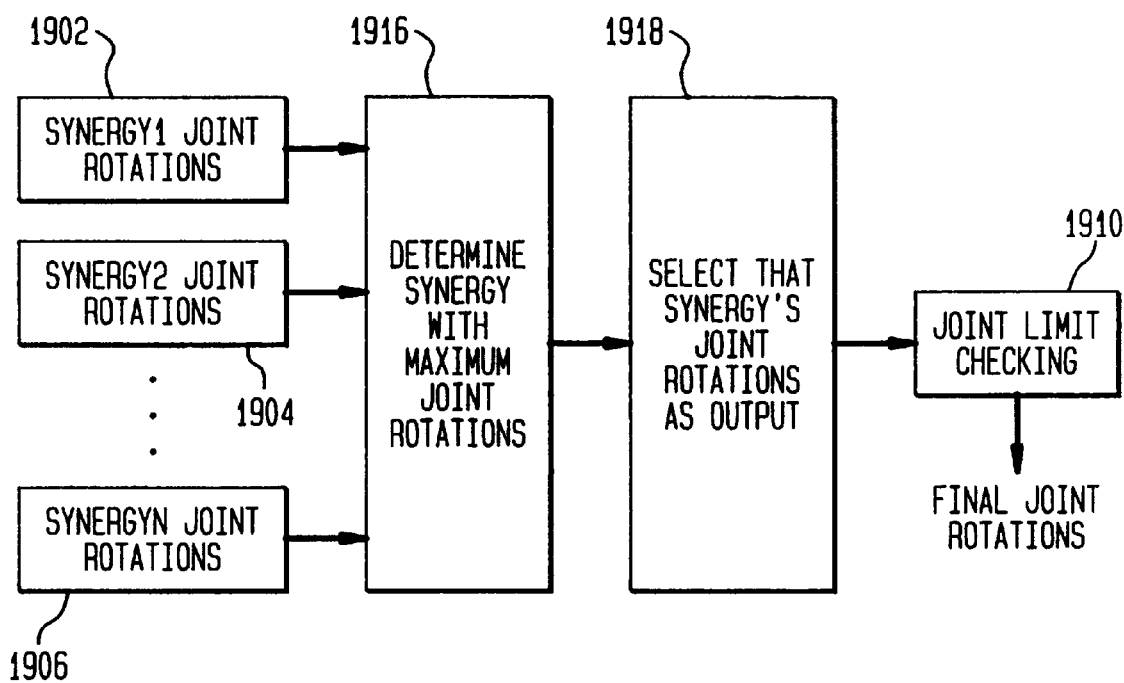
FIG. 19C is a flow chart diagram illustrating winner-take-all Synergy Coordination process in accordance with the present invention.

In FIG. 19A, each set of synergy joint rotations, 1902, 1904 and 1906 are given respective relative weights, i.e., weight 1, weight 2 and weight N. The weighted sum of the synergy outputs 1908, is checked against permissible joint position limits 1910 which generates the final joint rotations. In FIG. 19B, a priority based selection is implemented in which the synergies are arranged in a predetermined order of priority, with higher priority synergies considered first. In FIG. 19C, the synergy with the maximum joint rotations (most movement) is determined 1916 and selected 1918 as the synergy output. In all cases, the Synergy Coordination process also implements joint limitation constraints 1910 as the last step of synergy coordination.

In Synergy Coordination it often is desirable to compute the Posture Synergy joint angle movement commands first, apply these to the joints, and update the position and orientation of the body based upon forward kinematics 16 shown in FIG. 2. This new state of the body is then used as the starting point for the other synergy computations. The result of coordinating the synergies in this way is to produce joint angle movements that attempt to minimize individual synergy errors, while at the same time, staying as close to the nominal posture goal specified for the Posture synergy.

Interactive Motion Data Playback

As indicated above, synergy based interactive animation can be readily blended with fixed motion data, such as is recorded by motion capture or from keyframing. Generation of interactive motion data is achieved by using a hybrid approach in which non-interactive motion data playback and synergy-based control is blended at each time step to satisfy specified goals. Let $\Theta(t)$ denote the joint angles at time t specified by the non-interactive motion data, and let $\Delta\Theta(t)$ be the synergy-based control command computed at time t based on the body state and the goals at time t. Blending is achieved by using the joint angles $$\Phi(t) = \Theta(t) + \sum_{\tau=0}^{t} f(\Delta\Theta(\tau), \tau)$$

as the body's configuration at time t. Here, $f(.,.)$ is a time-dependent blending function that determines the relative weight of the synergy-based control component at each time step during playback. For example, if $$f(\delta, \tau) = \begin{cases} 0, & \text{if } \tau < T/2 \\ \delta, & \text{otherwise, where } \delta = \Delta\Theta(\tau) \end{cases}$$

where T is the total duration of the motion, then synergy based interactive control will only be effective in the second half of the motion and the first half of the motion is generated solely by motion capture data playback.

A side-effect of blending non-interactive motion data and interactive synergy-based control is that the body configuration at the end of playing back a sequence can be different after each playback. Lack of a deterministic end configuration could be a problem, especially if the next sequence to play starts in a configuration different from the one in which the present sequence playing has just ended. The continuity problem is overcome by using transition sequences to control the motion at the start and end of motion data playback. A transition sequence is generated in the present embodiment based on the initial and final positions and velocities of all the body's joints and goal positions. The user can specify the length of the transition sequence in terms of the number of time steps before the end of a sequence that the transition period starts and the number of time steps into the next sequence before the transition period ends.

Figure 20:
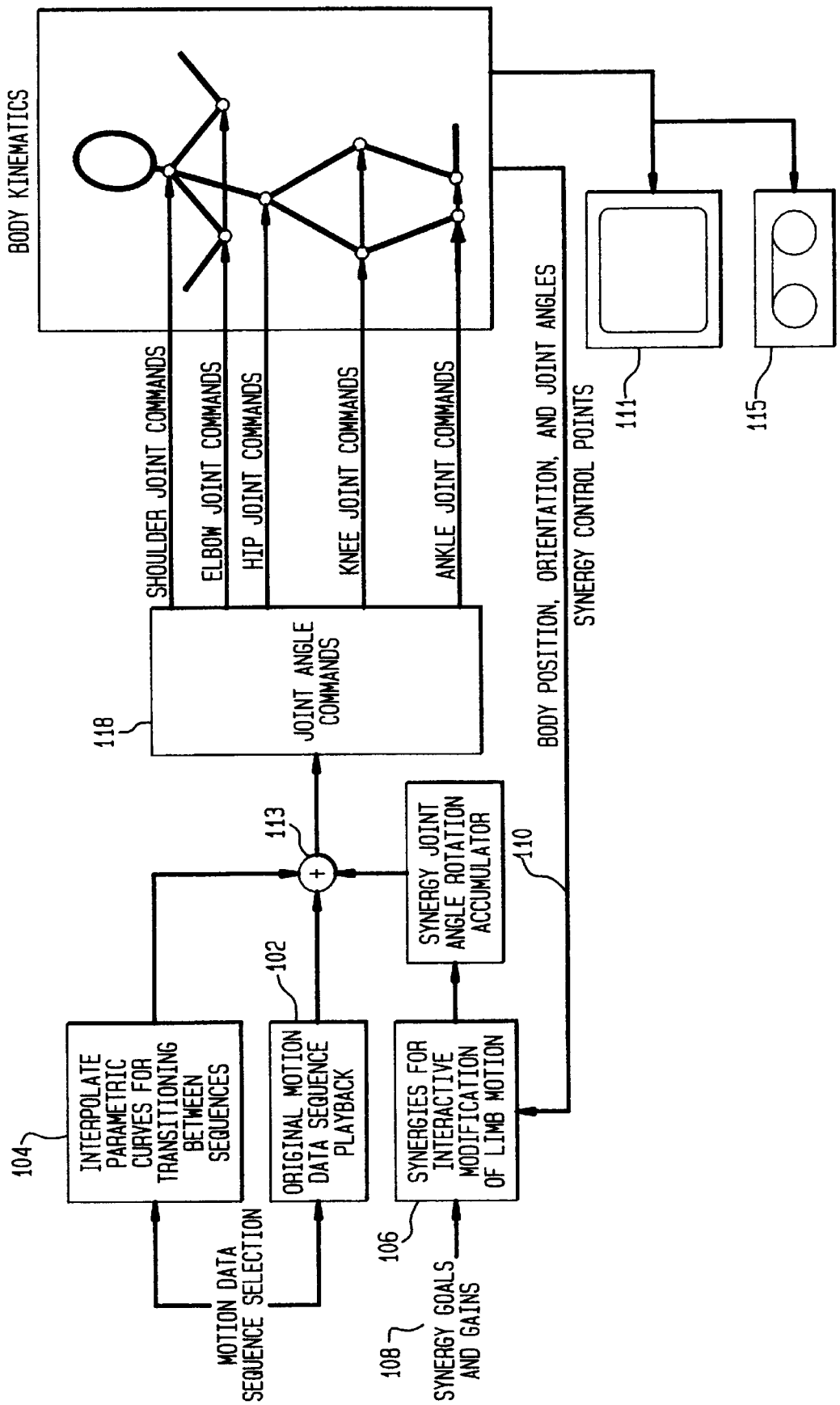
FIG. 20 is a block diagram of the overall system of interactive motion capture playback embodying the present invention.

An overview of the interactive motion data animation system is shown in FIG. 20. Three components are used to generate interactive motion data from recorded motion sequences. If a single original sequence is to be played back, the original sequence data 102 is sent as joint angle commands to the body, resulting in a reproduction of the recorded animation. If more than one sequence is to be played back, then it becomes necessary to smoothly connect the motion between sequences so that the overall movement is not abrupt or jerky. A smooth connection is accomplished by generating on-line transition sequences 104 obtained by constructing interpolating parametric curves between the two sequences. Each transition sequence specifies modifications to the nominal current sequence that will result in a smooth transition into the next sequence. These modifications are added to the joint angle commands from 102 during playback.

If interactive control of the body is desired during playback, synergies 106 and their associated control points are defined for the body. These synergies are assigned appropriate strengths and gains and are supplied with goals interactively 108. In addition, the synergies are provided with feedback 110 of the current body position and orientation and the body joint angles. Using this information, the synergies generate joint rotations which, when accumulated during the motion 112 and added 113 to the motion data 102, resulting in a modified motion of the body that satisfies the synergy goals. Note that in order to permit interactions while playing back several sequences and transiting between sequences, the transition sequence in 104 includes interpolated curves for the goal points used in the interactions. By adding 113 a transition sequence 104 to the motion data 102, a smooth interaction is possible even as the character performs several sequences in a row.

The outputs 118 of the of the combination of motion data 102, interpolation data 104 and synergy commands 106, 112, are commands to the body kinematics functions 16, which, in cooperation with the image storage, rendering and display functions actually animate the character by generating video for display 111 or storage 115, which may be a magnetic tape or form of disk storage media, or any computer memory.

Figure 21A:
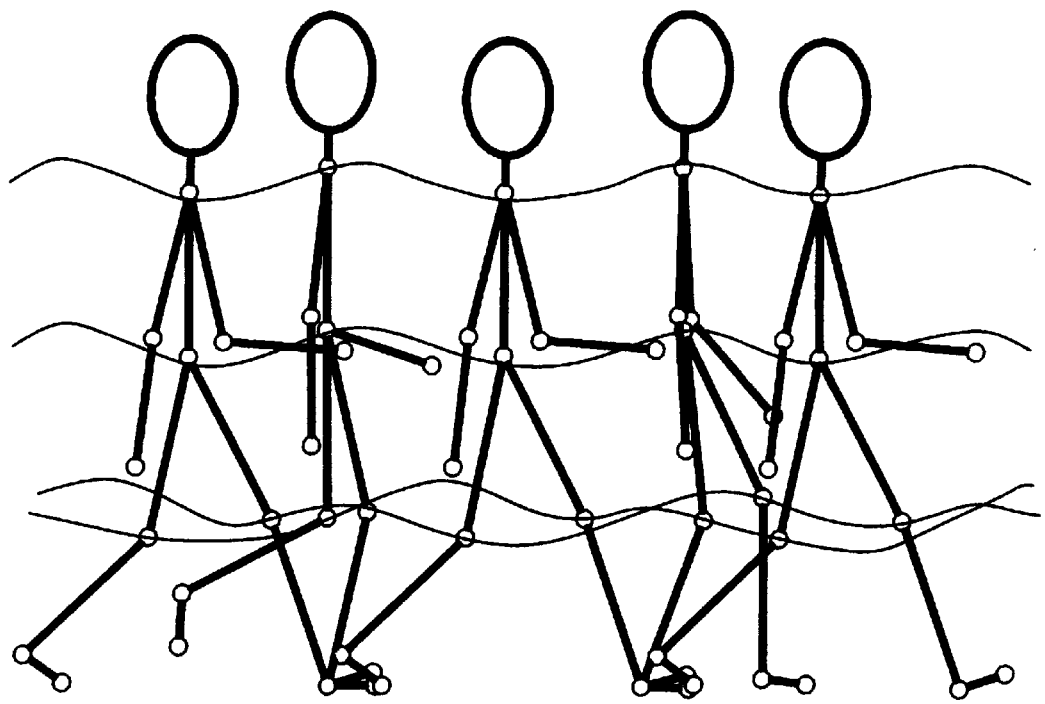
FIG. 21A is a stick figure illustrating a motion capture sequence.
Figure 21B:
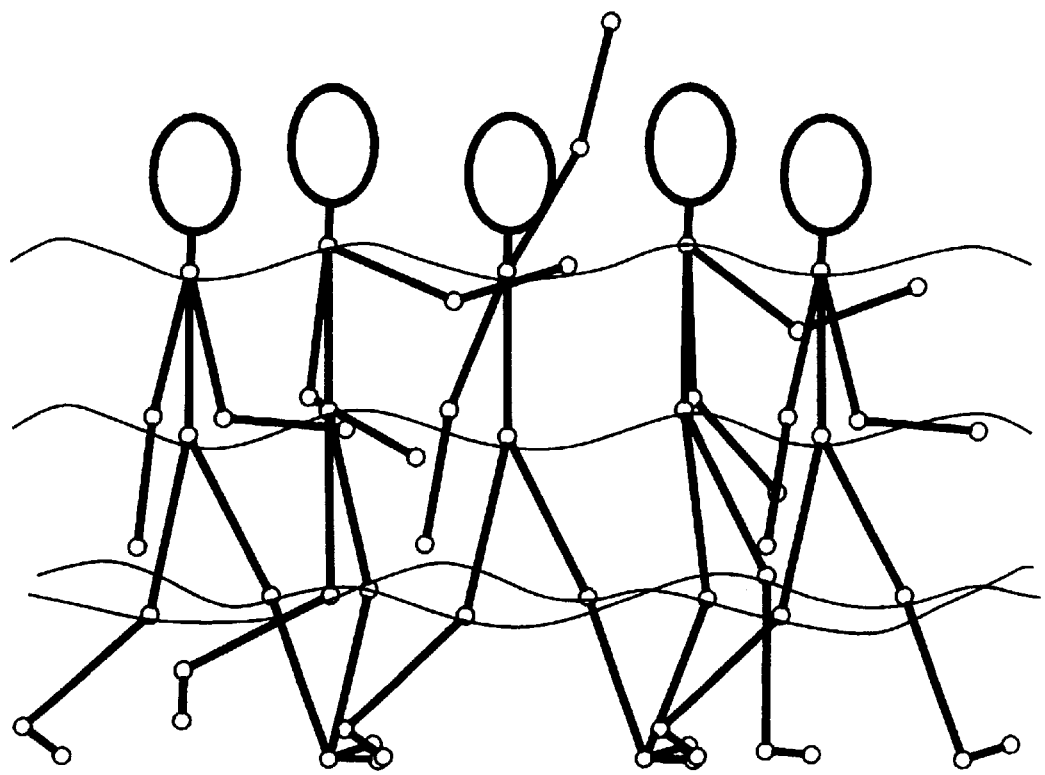
FIG. 21B is a is a stick figure illustrating a motion capture sequence integrated with a synergy based interactive sequence in accordance with the present invention.

FIGS. 2A and 2B illustrate an example of the above interactive motion data animation system. The original sequence, shown in FIG. 21A, consists of data for a normal walk with the arms swinging by the side of the body. If it is now desired to wave the right hand while the character is walking as before, the right hand is specified as a control point for a positioning synergy and its goal is specified as a trajectory that results in a wave. The synergy generates appropriate modifications to the non-interactive joint angle motion data that will result in the desired right hand wave while the rest of the body continues to walk as in the original sequence as shown in FIG. 21B.

Figure 22:
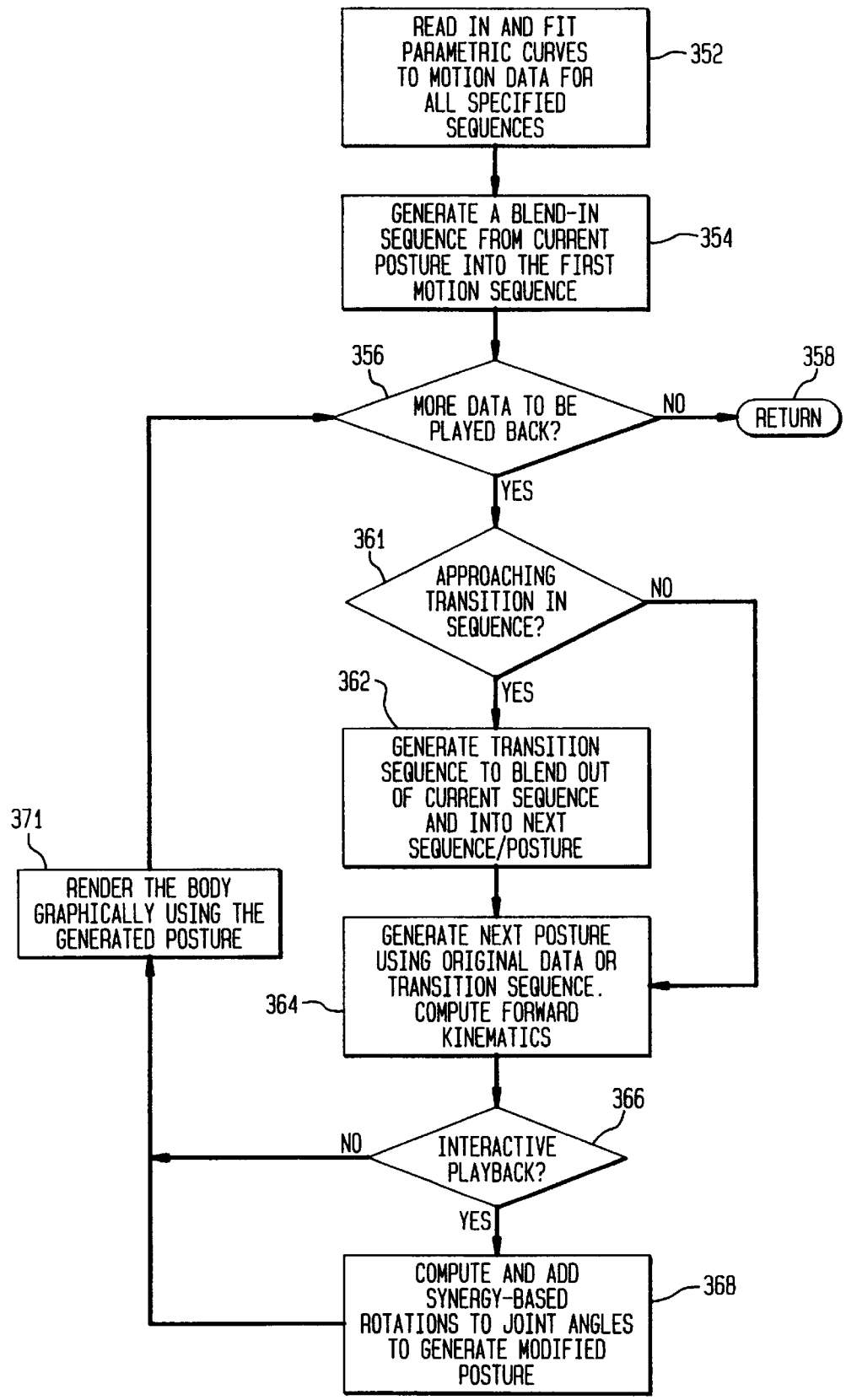
FIG. 22 is a flowchart diagram illustrating interactive motion capture playback in accordance with the present invention.

FIG. 3 is a flow chart diagram of the interactive motion data animation system. In step 352 of FIG. 22, for each specified motion data sequence, the motion data is read in and processed by fitting parametric curves to the data for each joint. To begin playback, a blend in (connecting) sequence is first generated in step 354 for the transition from the current body posture into the first motion sequence. Blending sequences are represented as parametric curves associated with each joint and synergy goal. In the present embodiment, these curves are generated taking into account the position and velocity of each joint's/goal's motion. Additional factors such as joint or goal accelerations also can be incorporated into the blending sequences.

Playback is then started by passing through the data time-step by time-step, checking for more data in step 356 and exiting the program if there is no more data to playback in step 358. If there is more playback data, then the program checks to see if the current data sequence is approaching its end in step 361. If it is, in step 362, a transition sequence is generated to blend out of the current sequence and into the next, if a next sequence is specified. If no next sequence is specified, the transition sequence blends out to a fixed posture of the body. The next posture for the body is generated in step 364 using either the original data or the transition sequence if one is active. The position of the body is then computed from the generated posture using forward kinematics.

If interactive playback is desired in step 366, synergies driven by the error between the body part positions and their interactively specified goal positions are used to compute rotations to joint angles that minimize the errors. The joint rotations computed by the synergies in step 368 are added to the joint angles of the body, resulting in a modified posture for the body that accommodates the interactively specified goals while playing back the original motion data. This posture is rendered at step 371, and the process is repeated from step 356.

Direct Motion Data Playback

In the arrangement of FIG. 20, non-interactive motion data 102 provides joint angle commands 118 to control body kinematics 116. When no contribution is made from interactive synergies 106, then animation is generated purely by non-interactive motion data playback. For example, it might be desirable to have the character's legs march (as in a parade) according to stored motion data, while the character's upper body (waving an arm) is under interactive synergy based control. One subset of joints is thus controlled by non-interactive motion data at the same time that an another subset of joints is controlled by interactive synergies.

Hybrid Motion Data Playback

Non-interactive motion data 102 may be actively blended with interactive synergy control of body kinematics 116. The blending of non-interactive motion data and interactive joint angle command data is accomplished by the same type of coordination as is carried out between the different synergies. Each synergy provides a set of joint angle commands for motion generated subject to a constraint, such as balance and the like. In the case of blending non-interactive motion data with interactive synergy based control, the motion data 106 is treated similar to the synergies, in that the non-interactive motion data joint angle commands are combined with the synergy joint angle commands, and thus becomes one of the factors influencing limb coordination.

Template Approach

Figure 23:
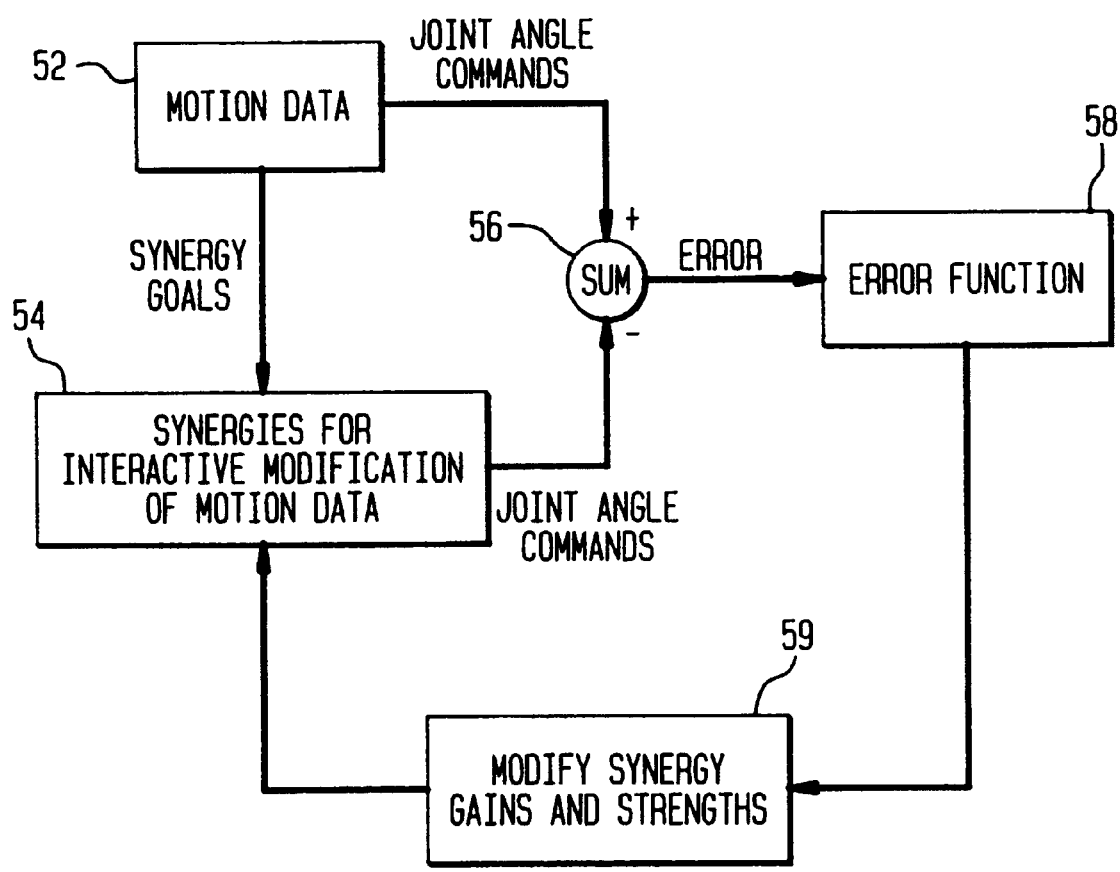
FIG. 23 is an example of a joint hierarchy for an armless biped character.

A different way to blend non-interactive motion data with interactive synergy-based control is to tune the parameters of the synergy-based interactive animation so that the output matches the non-interactive motion data as closely as practical. The primary adjustable parameters are synergy strengths and gains. In FIG. 23, non-interactive motion data 52 provides joint angle commands. Similarly, interactive synergies 54 provide joint angle commands. The difference between the two sets of joint angle commands is provided by the summer 56. A suitable error function 58, measures the difference between the non-interactive motion data joint angle commands and the joint angle commands produced under interactive control. The measured difference expressed as an error function is used to modify the synergy gains and strength factors.

Figure 24:
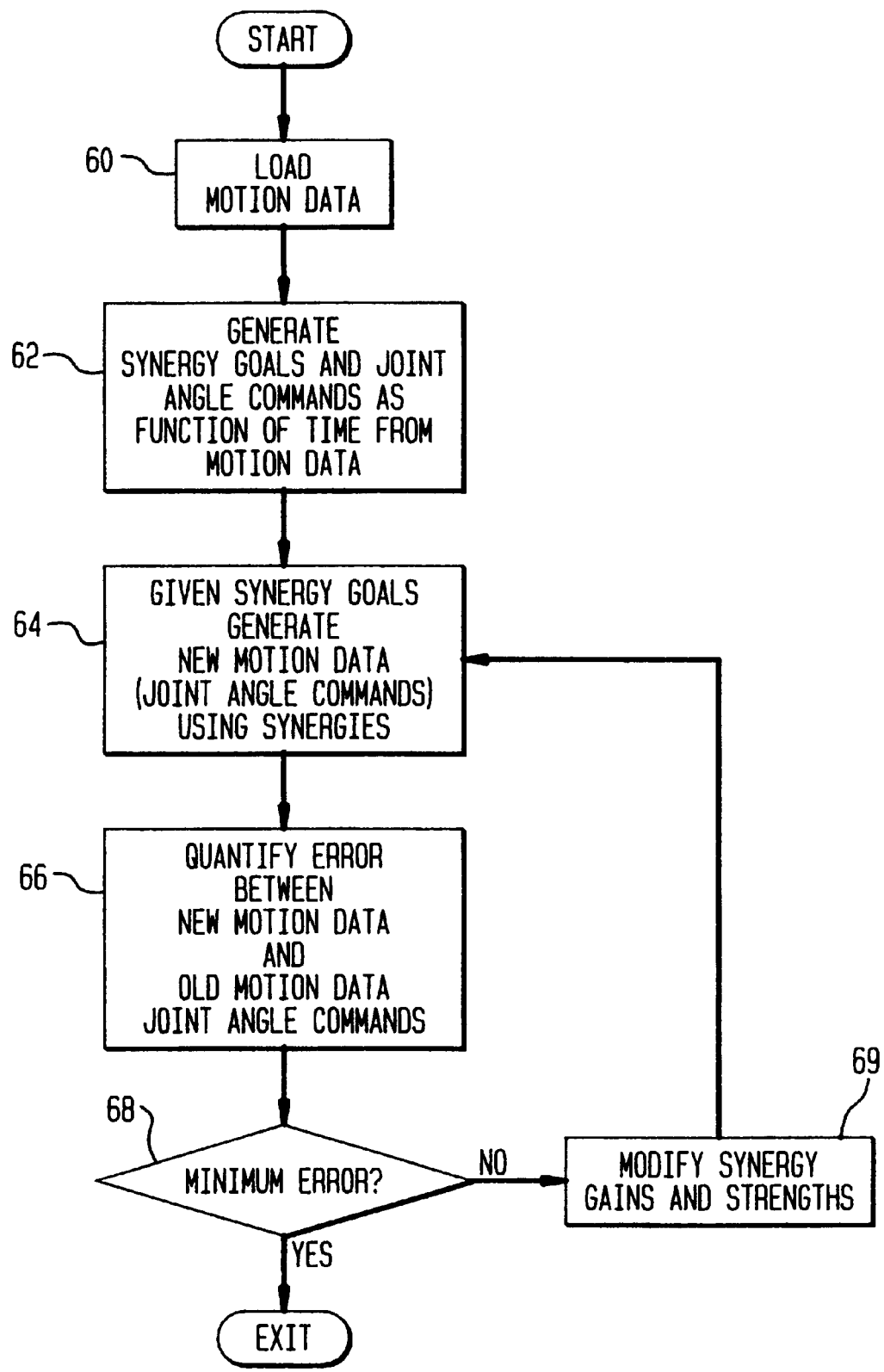
FIG. 24 is a block diagram of a system for creating a template using motion capture data to tune a synergy based interactive computer animation system.

A flow chart of the template generation process is illustrated in FIG. 24. First, non-interactive motion capture data is loaded 60 and played. Synergy goals and joint angle commands are generated as a function of time 62 from the non-interactive motion data. Using the computed synergy goals, new motion data (new joint angle commands) are generated using synergy based limb coordination.

The error, or difference between the joint angle commands from the non-interactive motion data and the joint angle commands from the synergies, is quantified at step 66. If the error is above some minimum at step 68, then the synergy gains and strengths are modified at step 69, and the process is repeated at step 64. For each iteration, the error is reduced, until the error is below some minimum, and the program exits at step 68.

The blending of non-interactive motion data directly, using a hybrid approach, or by template generation allows animated characters to exhibit the characteristics and nuances of recorded motions generated using keyframe, motion capture or other animation techniques, while at the same time exhibiting filly interactive behaviors.

What is claimed is:

1. A method for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said method further responsive to an input goal to animate said character subject to at least one constraint, said method comprising:

storing a representation of each of said first plurality of joints in said memory;

storing a representation of each of said plurality of links in said memory;

storing a representation of the respective positions of said first plurality of joints and said plurality of links in said memory;

storing said motion data in a memory;

computing, responsive to said stored motion data, a first set of motions derived from said stored motion data for each of said first plurality of joints respectively;

computing, responsive to said input goal, a second set of motions subject to said constraint for each of said first plurality of joints respectively, each motion of said second set of motions being computed for each respective joint independently of the others of said first plurality of joints with said others of said first plurality of joints being held substantially motionless;

combining said first set of motions with said second set of motions to form a combined set motions;

modifying said stored representation of the positions of said first plurality of joints and said plurality of links in said memory using said combined set of motions; and rendering said stored representation of said links as the limbs of said character figure in said video image memory.

2. A method in accordance with claim 1, wherein said step of computing said second set of motions further comprises;

computing a first motion for a first joint of said first plurality of joints while holding said plurality of joints substantially motionless except for said first joint;

moving said first joint in phantom in said memory by storing a representation of said first motion; and computing a second motion for a second joint of said first plurality of joints while holding said plurality of joints substantially motionless except for said second joint.

3. A method in accordance with 1, wherein said step of combining said first set of motions with said second set of motions to form a combined set motions comprises the weighted sum of said first and second set of motions.

4. A method in accordance with claim 1, wherein one of said first plurality of joints of said character figure is designated as a contact joint, and said step of computing said second set of motions subject to said constraint for each of said first plurality of joints, includes computing said second set of motions substantially in the order from a distal joint to a proximal joint, relative to said contact joint.

5. A method in accordance with claim 1, wherein one of said first plurality of joints of said character figure is designated as a contact joint, and said step of computing said second set of motions subject to said constraint for each of said first plurality of joints, includes computing said second set of motions substantially in the order from a proximal joint to a distal joint, relative to said contact joint.

6. A method in accordance with claim 1, wherein one of said first plurality of joints of said character figure is designated as a contact joint, and said step of computing said second set of motions subject to said constraint for each of said first plurality of joints, includes computing said second set of motions in an arbitrary order relative to said contact joint.

7. A method in accordance with claim 1, wherein each motion of said second set of motions is an angular rotation of one of said first plurality of joints.

8. A method in accordance with claim 1, wherein one of said first plurality of joints is designated as the control joint to be positioned, and wherein said input goal is a point in space defined as the goal point which is the desired location in space for said control joint, and wherein one of said second set of motions is the motion to position a proximal joint relative to said control joint, said step of computing said motion for said proximal joint comprises rotating said proximal joint while holding the others of said first set of joints substantially motionless to minimize the position error between said control joint and said goal point.

9. A method in accordance with claim 1, wherein one of said first plurality of joints is designated as the control joint to be positioned, and wherein said input goal is a point in space defined as the goal point which is the desired location in space for said control joint, and wherein one of said second set of motions is the motion to position a proximal joint relative to said control joint, said step of computing said motion for said proximal joint comprises rotating said proximal joint while holding the others of said first set of joints substantially motionless, so that the distance between the next proximal joint relative to said proximal joint and the control joint is substantially the same as the distance between the next proximal joint and the desired goal point location.

10. A method in accordance with claim 1, wherein said constraint is position.

11. A method in accordance with claim 1, wherein said constraint is alignment.

12. A method in accordance with claim 1, wherein said constraint is obstacle avoidance.

13. A method in accordance with claim 1, wherein said constraint is balance.

14. A method in accordance with claim 1, wherein said constraint is posture.

15. A method in accordance with claim 1, wherein said constraint is position, and wherein one of said first plurality of joints is designated as the control joint to be positioned, and wherein said input goal is a point in space defined as the goal point which is the desired location in space for said control joint, and wherein one of said second set of motions is the motion of a proximal joint relative to said control joint, said step of computing said motion for said proximal joint comprises rotating said proximal joint while holding the others of said first set of joints substantially motionless to minimize the error between said control joint and said goal point; and rotating said proximal joint while holding the others of said first set of joints substantially motionless, so that the distance between the next proximal joint relative to said proximal joint and the control joint is substantially the same as the distance between the next proximal joint and the desired goal point location.

16. A method in accordance with claim 1, wherein said constraint is alignment, and wherein one of said first plurality of links is designated as the link to be aligned, and wherein said input goal is a line in space defined as the goal link which is the desired direction in space for said control link, and wherein one of said second set of motions is the motion of a proximal joint relative to said control link, said step of computing said motion for said proximal joint comprises rotating said proximal joint while holding the others of said first set of joints substantially motionless to minimize the error between said control joint and said goal point; and rotating said proximal joint while holding the others of said first set of joints substantially motionless, so that the distance between the next proximal joint relative to said proximal joint and the control joint is substantially the same as the distance between the next proximal joint and the desired goal point location.

17. A method in accordance with claim 1, wherein said constraint is obstacle avoidance, and wherein one of said first plurality of joints is designated as the control joint to be positioned, and wherein said input goal is a point in space defined as the goal point which is the desired location in space for said control joint to avoid, and wherein one of said second set of motions is the motion of a proximal joint relative to said control joint, said step of computing said motion for said proximal joint comprises rotating said proximal joint while holding the others of said first set of joints substantially motionless to maximize the error between said control joint and said goal point; and rotating said proximal joint while holding the others of said first set of joints substantially motionless, so that the distance between the next proximal joint relative to said proximal joint and the control joint is substantially the same as the distance between the next proximal joint and the desired goal point location.

18. A method in accordance with claim 1, wherein said constraint is balance, said links have a respective mass associated therewith and a designated center of mass for said plurality of links, and wherein the center of mass of at least two of said first plurality of links is designated as the control center of mass to be positioned, and wherein said input goal is a point in space defined as the goal point which is the desired location in space for said designated center of mass for said plurality of links, and wherein one of said second set of motions is the motion of a proximal joint to position said control center of mass relative to said goal center of mass, said step of computing said motion for said proximal joint comprises rotating said proximal joint while holding the others of said first set of joints substantially motionless to minimize the error between said control center of mass and said goal center of mass; and rotating said proximal joint while holding the others of said first set of joints substantially motionless, so that the distance between the next proximal joint relative to said proximal joint and the control center of mass is substantially the same as the distance between the next proximal joint and the desired goal center of mass location.

19. A method for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said method further responsive to an input goal to animate said character subject to respective first and second constraints of said character figure, said method comprising:

storing a representation of each of said first plurality of joints in said memory;

storing a representation of each of said plurality of links in said memory;

storing a representation of the respective positions of said first plurality of joints and said plurality of links in said memory;

storing said motion data in a memory;

computing, responsive to said stored motion data, a first set of motions derived from said stored motion data for each of said first plurality of joints respectively;

computing, responsive to said input goal, a second set of motions subject to said first constraint for each of said first plurality of joints respectively;

computing, responsive to said input goal, a third set of motions subject to said second constraint for each of said first plurality of joints respectively;

combining said first set of motions with said second set of motions and said third set of motions to form a combined set motions;

modifying said stored representation of the positions of said first plurality of joints and said plurality of links in said memory using said combined set of motions; and rendering said stored representation of said links as the limbs of said character figure in said video image memory.

20. A method in accordance with claim 19, wherein said steps of computing said second set of motions and said third set of motions, respectively, further comprises;

computing, responsive to said input goal, said second set of motions subject to said first constraint for each of said first plurality of joints respectively, wherein each motion of said second set of motions is computed for each respective joint independently of the others of said first plurality of joints with said others of said first plurality of joints being held substantially motionless; and computing, responsive to said input goal, said third set of motions subject to said second constraint for each of said first plurality of joints respectively, wherein each motion of said third set of motions is computed for each respective joint independently of the others of said first plurality of joints with said others of said first plurality of joints being held substantially motionless.

21. A method in accordance with claim 19, wherein said steps of computing said second set of motions and said steps of computing said third set of motions, respectively, each further comprises;

computing a first motion for a first joint of said first plurality of joints while holding said plurality of joints substantially motionless except for said first joint;

moving said first joint in phantom in said memory by storing a representation of said first motion; and computing a second motion for a second joint of said first plurality of joints while holding said plurality of joints substantially motionless except for said second joint.

22. A method in accordance with 19, wherein said step of combining said second set of motions with said third set of motions to form a combined set motions comprises the weighted sum of said first and second set of motions.

23. A method in accordance with claim 19, wherein said step of combining said second set of motions with said third set of motions to form a combined set motions comprises the priority based selection of said first and second set of motions.

24. A method in accordance with claim 19, wherein said step of combining said second set of motions with said third set of motions to form a combined set motions comprises the winner take all selection of said first and second set of motions.

25. A method in accordance with claim 19, wherein one of said first plurality of joints of said character figure is designated as a contact joint, and said step of computing said second set of motions subject to said first constraint for each of said first plurality of joints, includes computing said second set of motions substantially in the order from a distal joint to a proximal joint, relative to said contact joint.

26. A method in accordance with claim 19, wherein one of said first plurality of joints of said character figure is designated as a contact joint, and said step of computing said second set of motions subject to said first constraint for each of said first plurality of joints, includes computing said second set of motions substantially in the order from a proximal joint to a distal joint, relative to said contact joint.

27. A method in accordance with claim 19, wherein each motion of said second set of motions is an angular rotation of one of said first plurality of joints.

28. A method in accordance with claim 19, wherein one of said first plurality of joints is designated as the control joint to be positioned, and wherein said input goal is a point in space defined as the goal point which is the desired location in space for said control joint, and wherein one of said second set of motions is the motion to position a proximal joint relative to said control joint, said step of computing said motion for said proximal joint comprises rotating said proximal joint while holding the others of said first set of joints substantially motionless to minimize the error between said control joint and said goal point.

29. A method in accordance with claim 19, wherein one of said first plurality of joints is designated as the control joint to be positioned, and wherein said input goal is a point in space defined as the goal point which is the desired location in space for said control joint, and wherein one of said second set of motions is the motion to position a proximal joint relative to said control joint, said step of computing said motion for said proximal joint comprises rotating said proximal joint while holding the others of said first set of joints substantially motionless, so that the distance between the next proximal joint relative to said proximal joint and the control joint is substantially the same as the distance between the next proximal joint and the desired goal point location.

30. A method in accordance with claim 19, wherein said first constraint is chosen from the group consisting of alignment, posture, balance, obstacle avoidance and joint limitation, and said second constraint chosen from remaining group of alignment, posture, balance, obstacle avoidance and joint limitation, said remaining group not including said first constraint.

31. A method in accordance with claim 19, wherein said first constraint is position and said second constraint is alignment.

32. A method in accordance with claim 19, wherein said first constraint is position and said second constraint is obstacle avoidance.

33. A method in accordance with claim 19, wherein said first constraint is position and said second constraint is balance.

34. A method in accordance with claim 19, wherein said first constraint is position and said second constraint is posture.

35. A method in accordance with claim 19, wherein said first constraint is obstacle avoidance and said second constraint is balance.

36. A method in accordance with claim 19, wherein said first constraint is balance and said second constraint is posture.

37. An apparatus for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said apparatus further responsive to an input goal to animate said character subject to at least one constraint, said apparatus comprising:

means for storing a representation of each of said first plurality of joints in said memory;

means for storing a representation of each of said plurality of links in said memory;

means for storing a representation of the respective positions of said first plurality of joints and said plurality of links in said memory;

means for storing said motion data in a memory;

means for computing, responsive to said stored motion data, a first set of motions derived from said stored motion data for each of said first plurality of joints respectively;

means for computing, responsive to said input goal, a second set of motions subject to said constraint for each of said first plurality of joints respectively, each motion of said second set of motions being computed for each respective joint independently of the others of said first plurality of joints with said others of said first plurality of joints being held substantially motionless;

means for combining said first set of motions with said second set of motions to form a combined set motions;

means for modifying said stored representation of the positions of said first plurality of joints and said plurality of links in said memory using said combined set of motions; and means for rendering said stored representation of said links as the limbs of said character figure in said video image memory.

38. An apparatus in accordance with claim 37, wherein said means for computing said second set of motions further comprises;

means for computing a first motion for a first joint of said first plurality of joints while holding said plurality of joints substantially motionless except for said first joint;

means for moving said first joint in phantom in said memory by storing a representation of said first motion; and means for computing a second motion for a second joint of said first plurality of joints while holding said plurality of joints substantially motionless except for said second joint.

39. An apparatus in accordance with 37, wherein said means for combining said first set of motions with said second set of motions to form a combined set motions comprises the weighted sum of said first and second set of motions.

40. An apparatus in accordance with claim 37, wherein one of said first plurality of joints of said character figure is designated as a contact joint, and said means for computing said second set of motions subject to said constraint for each of said first plurality of joints, includes means for computing said second set of motions substantially in the order from a distal joint to a proximal joint, relative to said contact joint.

41. An apparatus in accordance with claim 37, wherein one of said first plurality of joints of said character figure is designated as a contact joint, and said means for computing said second set of motions subject to said constraint for each of said first plurality of joints, includes means for computing said second set of motions substantially in the order from a proximal joint to a distal joint, relative to said contact joint.

42. An apparatus in accordance with claim 37, wherein one of said first plurality of joints of said character figure is designated as a contact joint, and said means for computing said second set of motions subject to said constraint for each of said first plurality of joints, includes means for computing said second set of motions in an arbitrary order relative to said contact joint.

43. An apparatus in accordance with claim 37, wherein each motion of said second set of motions is an angular rotation of one of said first plurality of joints.

44. An apparatus in accordance with claim 37, wherein one of said first plurality of joints is designated as the control joint to be positioned, and wherein said input goal is a point in space defined as the goal point which is the desired location in space for said control joint, and wherein one of said second set of motions is the motion to position a proximal joint relative to said control joint, said means for computing said motion for said proximal joint comprises means for rotating said proximal joint while holding the others of said first set of joints substantially motionless to minimize the position error between said control joint and said goal point.

45. An apparatus in accordance with claim 37, wherein one of said first plurality of joints is designated as the control joint to be positioned, and wherein said input goal is a point in space defined as the goal point which is the desired location in space for said control joint, and wherein one of said second set of motions is the motion to position a proximal joint relative to said control joint, said means for computing said motion for said proximal joint comprises means for rotating said proximal joint while holding the others of said first set of joints substantially motionless, so that the distance between the next proximal joint relative to said proximal joint and the control joint is substantially the same as the distance between the next proximal joint and the desired goal point location.

46. An apparatus in accordance with claim 37, wherein said constraint is position.

47. An apparatus in accordance with claim 37, wherein said constraint is alignment.

48. An apparatus in accordance with claim 37, wherein said constraint is obstacle avoidance.

49. An apparatus in accordance with claim 37, wherein said constraint is balance.

50. An apparatus in accordance with claim 37, wherein said constraint is posture.

51. An apparatus in accordance with claim 37, wherein said constraint is position, and wherein one of said first plurality of joints is designated as the control joint to be positioned, and wherein said input goal is a point in space defined as the goal point which is the desired location in space for said control joint, and wherein one of said second set of motions is the motion of a proximal joint relative to said control joint, said means for computing said motion for said proximal joint comprises means for rotating said proximal joint while holding the others of said first set of joints substantially motionless to minimize the error between said control joint and said goal point; and means for rotating said proximal joint while holding the others of said first set of joints substantially motionless, so that the distance between the next proximal joint relative to said proximal joint and the control joint is substantially the same as the distance between the next proximal joint and the desired goal point location.

52. An apparatus in accordance with claim 37, wherein said constraint is alignment, and wherein one of said first plurality of links is designated as the link to be aligned, and wherein said input goal is a line in space defined as the goal link which is the desired direction in space for said control link, and wherein one of said second set of motions is the motion of a proximal joint relative to said control link, said means for computing said motion for said proximal joint comprises means for rotating said proximal joint while holding the others of said first set of joints substantially motionless to minimize the error between said control joint and said goal point; and means for rotating said proximal joint while holding the others of said first set of joints substantially motionless, so that the distance between the next proximal joint relative to said proximal joint and the control joint is substantially the same as the distance between the next proximal joint and the desired goal point location.

53. An apparatus in accordance with claim 37, wherein said constraint is obstacle avoidance, and wherein one of said first plurality of joints is designated as the control joint to be positioned, and wherein said input goal is a point in space defined as the goal point which is the desired location in space for said control joint to avoid, and wherein one of said second set of motions is the motion of a proximal joint relative to said control joint, said means for computing said motion for said proximal joint comprises means for rotating said proximal joint while holding the others of said first set of joints substantially motionless to maximize the error between said control joint and said goal point; and means for rotating said proximal joint while holding the others of said first set of joints substantially motionless, so that the distance between the next proximal joint relative to said proximal joint and the control joint is substantially the same as the distance between the next proximal joint and the desired goal point location.

54. An apparatus in accordance with claim 37, wherein said constraint is balance, said links have a respective mass associated therewith and a designated center of mass for said plurality of links, and wherein the center of mass of at least two of said first plurality of links is designated as the control center of mass to be positioned, and wherein said input goal is a point in space defined as the goal point which is the desired location in space for said designated center of mass for said plurality of links, and wherein one of said second set of motions is the motion of a proximal joint to position said control center of mass relative to said goal center of mass, said means for computing said motion for said proximal joint comprises means for rotating said proximal joint while holding the others of said first set of joints substantially motionless to minimize the error between said control center of mass and said goal center of mass; and means for rotating said proximal joint while holding the others of said first set of joints substantially motionless, so that the distance between the next proximal joint relative to said proximal joint and the control center of mass is substantially the same as the distance between the next proximal joint and the desired goal center of mass location.

55. An apparatus for animating a character figure in a video image memory responsive to stored motion data, said character figure being represented in said memory as having a first plurality of joints and a plurality of links coupled between respective pairs of said first plurality of joints, said plurality of links representing respective limbs of said character figure, said apparatus further responsive to an input goal to animate said character subject to respective first and second constraints of said character figure, said apparatus comprising:

means for storing a representation of each of said first plurality of joints in said memory;

means for storing a representation of each of said plurality of links in said memory;

means for storing a representation of the respective positions of said first plurality of joints and said plurality of links in said memory;

means for storing said motion data in a memory;

means for computing, responsive to said stored motion data, a first set of motions derived from said stored motion data for each of said first plurality of joints respectively;

means for computing, responsive to said input goal, a second set of motions subject to said first constraint for each of said first plurality of joints respectively;

means for computing, responsive to said input goal, a third set of motions subject to said second constraint for each of said first plurality of joints respectively;

means for combining said first set of motions with said second set of motions and said third set of motions to form a combined set motions;

means for modifying said stored representation of the positions of said first plurality of joints and said plurality of links in said memory using said combined set of motions; and means for rendering said stored representation of said links as the limbs of said character figure in said video image memory.

56. An apparatus in accordance with claim 55, wherein said means for computing said second set of motions and said third set of motions, respectively, further comprises;

means for computing, responsive to said input goal, said second set of motions subject to said first constraint for each of said first plurality of joints respectively, wherein each motion of said second set of motions is computed for each respective joint independently of the others of said first plurality of joints with said others of said first plurality of joints being held substantially motionless; and means for computing, responsive to said input goal, said third set of motions subject to said second constraint for each of said first plurality of joints respectively, wherein each motion of said third set of motions is computed for each respective joint independently of the others of said first plurality of joints with said others of said first plurality of joints being held substantially motionless.

57. An apparatus in accordance with claim 55, wherein said means for computing said second set of motions and said means for computing said third set of motions, respectively, each further comprises;

means for computing a first motion for a first joint of said first plurality of joints while holding said plurality of joints substantially motionless except for said first joint;

means for moving said first joint in phantom in said memory by storing a representation of said first motion; and means for computing a second motion for a second joint of said first plurality of joints while holding said plurality of joints substantially motionless except for said second joint.

58. An apparatus in accordance with 55, wherein said means for combining said second set of motions with said third set of motions to form a combined set motions comprises the weighted sum of said first and second set of motions.

59. An apparatus in accordance with 55, wherein said means for combining said second set of motions with said third set of motions to form a combined set motions comprises the priority based selection of said first and second set of motions.

60. An apparatus in accordance with 55, wherein said means for combining said second set of motions with said third set of motions to form a combined set motions comprises the winner take all selection of said first and second set of motions.

61. An apparatus in accordance with claim 55, wherein one of said first plurality of joints of said character figure is designated as a contact joint, and said means for computing said second set of motions subject to said first constraint for each of said first plurality of joints, includes means for computing said second set of motions substantially in the order from a distal joint to a proximal joint, relative to said contact joint.

62. An apparatus in accordance with claim 55, wherein one of said first plurality of joints of said character figure is designated as a contact joint, and said means for computing said second set of motions subject to said first constraint for each of said first plurality of joints, includes means for computing said second set of motions substantially in the order from a proximal joint to a distal joint, relative to said contact joint.

63. An apparatus in accordance with claim 55, wherein each motion of said second set of motions is an angular rotation of one of said first plurality of joints.

64. An apparatus in accordance with claim 55, wherein one of said first plurality of joints is designated as the control joint to be positioned, and wherein said input goal is a point in space defined as the goal point which is the desired location in space for said control joint, and wherein one of said second set of motions is the motion to position a proximal joint relative to said control joint, said means for computing said motion for said proximal joint comprises means for rotating said proximal joint while holding the others of said first set of joints substantially motionless to minimize the error between said control joint and said goal point.

65. An apparatus in accordance with claim 55, wherein one of said first plurality of joints is designated as the control joint to be positioned, and wherein said input goal is a point in space defined as the goal point which is the desired location in space for said control joint, and wherein one of said second set of motions is the motion to position a proximal joint relative to said control joint, said means for computing said motion for said proximal joint comprises means for rotating said proximal joint while holding the others of said first set of joints substantially motionless, so that the distance between the next proximal joint relative to said proximal joint and the control joint is substantially the same as the distance between the next proximal joint and the desired goal point location.

66. An apparatus in accordance with claim 55, wherein said first constraint is chosen from the group consisting of alignment, posture, balance, obstacle avoidance and joint limitation, and said second constraint chosen from remaining group of alignment, posture, balance, obstacle avoidance and joint limitation, said remaining group not including said first constraint.

67. An apparatus in accordance with claim 55, wherein said first constraint is position and said second constraint is alignment.

68. An apparatus in accordance with claim 55, wherein said first constraint is position and said second constraint is obstacle avoidance.

69. An apparatus in accordance with claim 55, wherein said first constraint is position and said second constraint is balance.

70. An apparatus in accordance with claim 55, wherein said first constraint is position and said second constraint is posture.

71. An apparatus in accordance with claim 55, wherein said first constraint is obstacle avoidance and said second constraint is balance.

72. An apparatus in accordance with claim 55, wherein said first constraint is balance and said second constraint is posture.

* * * * *